United States Patent
Bell et al.

(10) Patent No.: US 10,055,397 B2
(45) Date of Patent: Aug. 21, 2018

(54) MECHANISM FOR SYNCHRONISING DEVICES, SYSTEM AND METHOD

(71) Applicant: TOUCHTYPE LIMITED, London (GB)

(72) Inventors: Michael Bell, London (GB); Joe Freeman, Exeter (GB); Emanuel George Hategan, Cambridge (GB); Benjamin Medlock, London (GB)

(73) Assignee: TOUCHTYPE LIMITED, London (GB)

(*) Notice: Subject to any disclaimer, the term of this patent is extended or adjusted under 35 U.S.C. 154(b) by 0 days.

(21) Appl. No.: 14/401,500

(22) PCT Filed: May 14, 2013

(86) PCT No.: PCT/GB2013/051244
§ 371 (c)(1),
(2) Date: Nov. 14, 2014

(87) PCT Pub. No.: WO2013/171481
PCT Pub. Date: Nov. 21, 2013

(65) Prior Publication Data
US 2015/0134326 A1    May 14, 2015

(30) Foreign Application Priority Data
May 14, 2012    (GB) .................... 1208373.9

(51) Int. Cl.
*G06F 3/023*    (2006.01)
*G06F 17/27*    (2006.01)
*G06F 17/22*    (2006.01)

(52) U.S. Cl.
CPC ............ *G06F 17/27* (2013.01); *G06F 17/276* (2013.01); *G06F 3/0237* (2013.01); *G06F 17/2211* (2013.01); *G06F 17/2735* (2013.01)

(58) Field of Classification Search
CPC ... G06F 3/00; G06F 3/01; G06F 12/00; G06F 17/27; G06F 17/2735; G06F 2/0237
(Continued)

(56) References Cited

U.S. PATENT DOCUMENTS 7,035,788 B1 * 4/2006 Nakajima ........... G06F 17/2715
704/1
7,035,866 B1   4/2006 Chen et al.
(Continued)

FOREIGN PATENT DOCUMENTS

WO    WO 2010/112841 A1    10/2010

OTHER PUBLICATIONS

"Office Action Issued in Japan Patent Application No. 2015-512123", dated Apr. 25, 2017, 7 Pages.
(Continued)

*Primary Examiner* — James Wozniak
(74) *Attorney, Agent, or Firm* — Schwegman Lundberg & Woessner, P.A.

(57) ABSTRACT

There is provided a mechanism for synchronizing a plurality of dynamic language models residing in a plurality of devices associated with a single user, each device comprising a dynamic language model. The mechanism is configured to: receive text data representing text that has been input by a user into one or more of the plurality of devices; train at least one language model on the text data; and provide the at least one language model for synchronizing the devices. There is also provided a system comprising the mechanism and a plurality of devices, and a method for synchronizing a plurality of dynamic language models residing in a plurality of devices associated with a single user.

28 Claims, 12 Drawing Sheets

(58) Field of Classification Search
USPC .................................. 704/10, 1, 9; 715/261
See application file for complete search history.

(56) References Cited

U.S. PATENT DOCUMENTS

| | | | | |
|---|---|---|---|---|
| 7,228,275 | B1* | 6/2007 | Endo | G10L 15/32 704/231 |
| 7,509,636 | B2 | 3/2009 | McGuire et al. | |
| 7,912,700 | B2 | 3/2011 | Bower et al. | |
| 8,380,502 | B1* | 2/2013 | Franz | G10L 15/22 704/236 |
| 8,909,628 | B1* | 12/2014 | Kwok | G06Q 30/0201 707/723 |
| 2002/0132613 | A1* | 9/2002 | Leung | H03M 7/3088 455/414.1 |
| 2005/0216441 | A1 | 9/2005 | Thomas et al. | |
| 2007/0116007 | A1* | 5/2007 | Xiao | H04L 47/10 370/395.4 |
| 2007/0124134 | A1* | 5/2007 | Van Kommer | G06Q 30/02 704/10 |
| 2007/0174695 | A1* | 7/2007 | Varadarajan | G06F 11/1438 714/15 |
| 2008/0195388 | A1* | 8/2008 | Bower | G06F 3/0237 704/243 |
| 2009/0113412 | A1 | 4/2009 | Shribman et al. | |
| 2009/0249116 | A1* | 10/2009 | Bartfai | G06F 11/2066 714/6.12 |
| 2010/0042683 | A1* | 2/2010 | Fricke | H04L 29/06 709/203 |
| 2011/0201387 | A1* | 8/2011 | Paek | G06F 3/0237 455/566 |
| 2011/0208805 | A1 | 8/2011 | Kasetty et al. | |
| 2011/0264658 | A1* | 10/2011 | Wen | G06F 17/30687 707/728 |
| 2011/0282874 | A1* | 11/2011 | Xu | G06F 17/30616 707/737 |
| 2011/0296374 | A1 | 12/2011 | Wu et al. | |
| 2013/0080162 | A1* | 3/2013 | Chang | G10L 15/34 704/235 |
| 2014/0108003 | A1* | 4/2014 | Phillips | G06F 17/275 704/8 |
| 2014/0122591 | A1* | 5/2014 | Roche | H04L 67/306 709/204 |
| 2014/0278294 | A1* | 9/2014 | Yeager | G06F 17/5009 703/2 |
| 2014/0310213 | A1* | 10/2014 | Badger | G06F 3/0237 706/12 |
| 2014/0316784 | A1* | 10/2014 | Bradford | G10L 15/18 704/245 |
| 2015/0234807 | A1* | 8/2015 | Phillips | G06F 17/275 704/9 |
| 2015/0269938 | A1* | 9/2015 | Lloyd | G10L 15/183 704/235 |

OTHER PUBLICATIONS

"Third Office Action Issued in Chinese Patent Application No. 201380035041.8", dated Jul. 19, 2017, 14 Pages.

"Office Action Issued in Japanese Patent Application No. 2015-512123", dated Nov. 6, 2017, 6 Pages.

"Office Action Issued in Japanese Patent Application No. 2015-512123", dated Feb. 14, 2018, 4 Pages.

* cited by examiner

MECHANISM FOR SYNCHRONISING DEVICES, SYSTEM AND METHOD

The present invention relates to a mechanism for synchronising devices and a method for doing so.

BACKGROUND

Many users enter text into a plurality of devices. For example, a user may type text messages (SMS/MMS) or emails on a mobile phone in addition to writing emails or documents on a tablet or PC. Each of the devices comprises a text entry system to aid the user in their text entry.

The text entry system may comprise a language model which may be a probabilistic encapsulation of a given language style, e.g. a user's writing style. A language model based text entry system is capable of enhancing the typing experience on an electronic device through a range of functionality, e.g. correcting mistyped/misspelled input based on language and/or predicting likely future terms in a sequence.

The language model may be a dynamic language model, which is trained progressively on user input as the user enters text into the device, thus enabling the text entry system to correct mistyped/misspelled input or predict likely future terms in a sequence based on text previously entered by a user.

The inventors of the present application have identified a problem experienced by a user owning a plurality of devices, each of which learns the user's language style over time: the predictions generated by the devices can become divergent with use. For example, a user may use one device much more frequently that the other devices. The frequently used device will generate more accurate predictions for that user than the devices which are not often used, and this will be both annoying and problematic for the user.

It is an object of the invention to overcome such a problem.

SUMMARY OF THE INVENTION

In one aspect of the invention, there is provided a mechanism for synchronising a plurality of dynamic language models residing in a plurality of devices associated with a single user, each device comprising a dynamic language model. The mechanism is configured to: receive text data representing text that has been input by a user into one or more of the plurality of devices; incorporate the text data into at least one language model; and provide the at least one language model for synchronising the devices.

The text data can be any data representing the text input by the user. In a first embodiment, the text data may comprise the actual text input by the user. In this case, incorporating the text data into a language model may comprise training the language model on text entered by the user. In a second embodiment, the text data may be a device delta language model which has been trained on the text input. In this case, incorporating the text data into a language model may comprise merging the device delta language model into the at least one language model.

Thus, in a first embodiment of the mechanism of the invention, there is provided a mechanism for synchronising a plurality of dynamic language models residing in a plurality of devices associated with a single user, each device comprising a dynamic language model. The mechanism is configured to: receive text that has been input by a user into one or more of the plurality of devices; train at least one language model on the text; and provide the at least one language model for synchronising the devices.

Preferably, the mechanism is configured to train at least one language model on the text by generating at least one language model from the text or training at least one existing language model with the text.

The text may comprise any text input into the plurality of devices and training at least one language model preferably comprises training a single language model on the text to generate a cumulative language model. The text may comprise text entered into any of the plurality of devices since a previous synchronisation of the plurality of dynamic language models and training at least one language model comprises training further the cumulative language model on that text.

Training at least one language model may comprise generating a delta language model for each of the plurality of devices using the text received from the plurality of devices except the device associated with the specific delta language model.

The mechanism is preferably configured to synchronise with a single device of the plurality of devices at a given time.

The mechanism may be configured to authenticate a user.

In the second embodiment of the mechanism of the invention, there is provided a mechanism for synchronising a plurality of dynamic language models residing in a plurality of devices associated with a single user, each device comprising a dynamic language model and a device delta language model trained on text input by a user into that device. The mechanism is configured to: receive the device delta language model; merge the device delta language model into at least one language model; and provide the at least one language model for synchronising the devices.

Preferably, the mechanism is configured to merge the device delta language model into the at least one language model by generating at least one language model from the device delta language model or merging the device delta language model with at least one existing language model.

Merging the device delta language model into at least one language model comprises merging the device delta language model into a single language model to generate a cumulative language model. The device delta language model may be trained on text entered into one of the plurality of devices since a previous synchronisation of the plurality of dynamic language models. Merging the device delta language model into at least one language model may comprise generating a delta language model for each of the plurality of devices using the device delta language models received from the plurality of devices except the device associated with the specific delta language model.

The mechanism is preferably configured to synchronise with a single device of the plurality of devices at a given time.

The mechanism may be configured to authenticate a user.

In a second aspect of the invention there is provided a system for text entry. The system comprises a plurality of devices, each device comprising a dynamic language model; and the mechanism according to any of the above embodiments. Each of the plurality of devices is configured to transmit to the mechanism text data representing text entered into that device.

In a first embodiment of the system of the invention, the text data representing text entered into that device is the actual text entered into the device.

Each device of the system may be configured to receive the cumulative language model and merge the cumulative language model into its dynamic language model before transmitting to the mechanism the text entered into that device.

Each device may be configured to receive the specific delta language model associated with that device and merge the delta language model into its dynamic language model.

Each dynamic language model of each device may be configured to generate at least one text prediction based on text input into the device and wherein, once synchronised, the plurality of dynamic language models are capable of generating the same at least one text prediction when provided with the same text input.

In one embodiment of this system, the mechanism comprises a server and each of the plurality of devices is configured to download the cumulative or delta language model from the server and upload the text onto the server. The system may comprise a secure connection means between the server and each of the plurality of devices.

For the above-described mechanism or system, a language model may comprise a data structure associating sequences of terms with a frequency of occurrence for each sequence. The device may be configured to merge a first language model with a second language model by: adding the frequencies of occurrence for sequences in the data structure of the second language model to the frequencies of occurrence for the corresponding sequences in the data structure of the first language model; and inserting a new sequence and its corresponding frequency of occurrence into the data structure of the first language model, if that sequence is in the data structure of the second language model but not in the data structure of the first language model. Each device may be configured to remove one or more sequences from the merged data structure, if the one or more sequences have a frequency of occurrence falling below a threshold value.

In a second embodiment of the system of the present invention, the text data representing the text entered into a device is a delta language model which has been trained on the text entered into that device. In this embodiment, the system comprises a plurality of devices, each device comprising a dynamic language model and a device delta language model trained on text input by a user into that device; and the mechanism according to any of the above embodiments. Each of the plurality of devices is configured to transmit to the mechanism the device delta language model.

Each device of the system may be configured to receive the cumulative language model and merge the cumulative language model into its dynamic language model before transmitting to the mechanism the delta language model.

Each device may be configured to receive the specific delta language model associated with that device and merge the delta language model into its dynamic language model.

Each dynamic language model of each device may be configured to generate at least one text prediction based on text input into the device and wherein, once synchronised, the plurality of dynamic language models are capable of generating the same at least one text prediction when provided with the same text input.

In one embodiment of this system, the mechanism comprises a server and each of the plurality of devices is configured to download the cumulative or delta language model from the server and upload the device delta language model onto the server. The system may comprise a secure connection means between the server and each of the plurality of devices.

For the above-described mechanism or system, a language model may comprise a data structure associating sequences of terms with a frequency of occurrence for each sequence. The mechanism and/or device may be configured to merge a first language model with a second language model by: adding the frequencies of occurrence for sequences in the data structure of the second language model to the frequencies of occurrence for the corresponding sequences in the data structure of the first language model; and inserting a new sequence and its corresponding frequency of occurrence into the data structure of the first language model, if that sequence is in the data structure of the second language model but not in the data structure of the first language model. The mechanism and/or each device may be configured to remove one or more sequences from the merged data structure, if the one or more sequences have a frequency of occurrence falling below a threshold value.

In a third aspect of the invention there is provided a method for synchronising a plurality of dynamic language models residing in a plurality of devices associated with a single user, each device comprising a dynamic language model. The method comprises: receiving, at a mechanism for synchronising, text data representing text that has been input by a user into one or more of the plurality of devices; training, with the mechanism, at least one language model on the text data; and providing the at least one language model for synchronising the devices with the mechanism.

In a first embodiment of the method of the invention, the text data representing the text that has been input into the device is that actual text entered into the device.

Training at least one language model on the text preferably comprises generating at least one language model from the text or training at least one existing language model with the text.

The text may comprise any text input into the plurality of devices and training at least one language model preferably comprises training a single language model on the text to generate a cumulative language model. The text may comprises text entered into the plurality of devices since a previous synchronisation of the plurality of devices and training at least one language model comprises training further the cumulative language model on that text.

Preferably, each of the plurality of devices is synchronised individually with the mechanism.

The cumulative language model may be trained on the text received by the mechanism from any device that has synchronised initially with the mechanism. The cumulative language model may be trained further on the text received by the mechanism from any device that has synchronised subsequently with the mechanism.

Training at least one language model may comprise generating a delta language model for each of the plurality of devices using the text received by the mechanism from the plurality of devices except the device associated with the specific delta language model.

The text used to train the delta language models may comprises the text received by the mechanism during a synchronisation and/or subsequent synchronisation of the plurality of devices except the device associated with the specific delta language model.

The method may comprise the mechanism authenticating a user.

Preferably, the method comprises each device receiving the cumulative language model and merging the cumulative language model into the dynamic language model associated with that device prior to transmitting to the mechanism text entered into that device.

Preferably, the method comprises each device receiving the specific delta language model associated with that device and merging the delta language model into the dynamic language model of that device.

The mechanism preferably comprises a server. The method further comprising establishing a secure connection between the server and each of the plurality of devices.

A language model may comprise a data structure associating sequences of terms with a frequency of occurrence for each sequence. Merging, in the method, a first language model with a second language model preferably comprises: adding the frequencies of occurrence for sequences in the data structure of the second language model to the frequencies of occurrence for the corresponding sequences in the data structure of the first language model; and inserting a new sequence and its corresponding frequency of occurrence into the data structure of the first language model, if that sequence is in the data structure of the second language model but not in the data structure of the first language model. The method may further comprise each of the plurality of devices removing one or more sequences from the merged data structure, if the one or more sequences have a frequency of occurrence falling below a threshold value.

In second embodiment of the method of the invention, the text data is a device delta language model which has been trained on the text input. In this case, each device comprises a dynamic language model and a device delta language model trained on text input by a user into that device. The method comprises: receiving, at a mechanism for synchronising, a device delta language model; merging, with the mechanism, the device delta language model with at least one language model; and providing the at least one language model for synchronising the devices with the mechanism.

Merging the device delta language model into the at least one language model preferably comprises generating at least one language model from the device delta language model or merging the device delta language model with at least one existing language model.

Merging the device delta language model into at least one language model may comprise merging the device delta language model into a single language model to generate a cumulative language model. The device delta language model may have been trained on text entered into one of the plurality of devices since a previous synchronisation of the plurality of dynamic language models.

Preferably, each of the plurality of devices is synchronised individually with the mechanism.

Any device delta language model received from any device that has synchronised initially with the mechanism may be merged with the cumulative language model. Any device delta language model received from any device that has synchronised subsequently with the mechanism may be merged with the cumulative language model.

Merging the device delta language model with at least one language model may comprise generating a delta language model for each of the plurality of devices using the device delta language models received by the mechanism from the plurality of devices except the device associated with the specific delta language model.

The device delta language models merged with the delta language models may comprise the device delta language models received by the mechanism during synchronisation and/or subsequent synchronisation of the plurality of devices except the device associated with the specific delta language model.

The method may comprise the mechanism authenticating a user.

Preferably, the method comprises each device receiving the cumulative language model and merging the cumulative language model into the dynamic language model associated with that device prior to transmitting to the mechanism the device delta language model.

Preferably, the method comprises each device receiving the specific delta language model associated with that device and merging the delta language model into the dynamic language model of that device.

The mechanism preferably comprises a server. The method further comprising establishing a secure connection between the server and each of the plurality of devices.

A language model may comprise a data structure associating sequences of terms with a frequency of occurrence for each sequence. Merging, in the method, a first language model with a second language model preferably comprises: adding the frequencies of occurrence for sequences in the data structure of the second language model to the frequencies of occurrence for the corresponding sequences in the data structure of the first language model; and inserting a new sequence and its corresponding frequency of occurrence into the data structure of the first language model, if that sequence is in the data structure of the second language model but not in the data structure of the first language model. The method may further comprise each of the plurality of devices removing one or more sequences from the merged data structure, if the one or more sequences have a frequency of occurrence falling below a threshold value.

In a fourth aspect of the invention, there is provided a computer program product comprising a computer readable medium having stored thereon computer program means for causing a processor to carry out any of the methods as described above.

In a fifth aspect of the invention there is provided a method of periodically synchronising data between a mechanism and a device. The method comprises storing, at the mechanism, a parameter identifying the data bundle sent to the device during the last synchronisation of the device; storing, at the mechanism, a primary data bundle comprising updates to the data since the last synchronisation of the device; storing, at the mechanism, a back-up data bundle comprising the data bundle sent to the device during the last synchronisation of the device and updates to the data since the last synchronisation of the device; receiving, at the mechanism, a parameter from the device identifying the data bundle last received by the device and comparing it to the stored parameter; and transmitting the primary data bundle if the stored and received parameters are identical, or transmitting the back-up data bundle if the stored and received parameters are not identical.

BRIEF DESCRIPTION OF THE DRAWINGS

The present invention will now be described in detail with reference to the accompanying drawings, in which.

DETAILED DESCRIPTION OF THE INVENTION

The present invention provides a mechanism for synchronizing a plurality of dynamic language models which reside in a plurality of devices. Each device comprises a dynamic language model, this dynamic language model evolving with user inputted text to more accurately predict the words the user intends to write.

By synchronising the dynamic language models, the system is able to improve the consistency of the text predictions generated across the devices of the system, enabling multiple devices to provide similar word predictions and corrections. Thus, the present invention solves the problem that a seldom used device remains poor at providing accurate predictions, since each device learns from the other devices that have been/are used by the same user.

Figure 1:
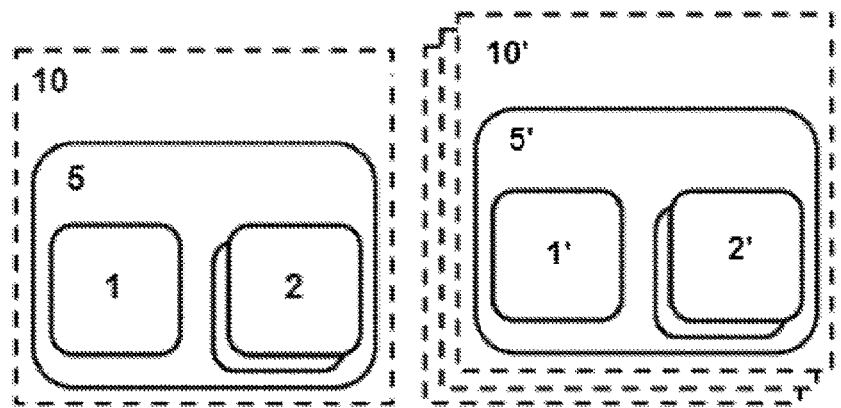
FIG. 1 illustrates a plurality of devices in accordance with the present invention.

FIG. 1 illustrates a plurality of devices 10, 10' in accordance with the present invention. Each device 10, 10' comprises a dynamic language model 1, 1'. Preferably, each device 10, 10' comprises a text entry system 5, 5' that comprises the dynamic language model 1, 1' and optionally one or more static language models 2, 2'. A static language model 2 is a language model which, once trained, does not evolve with user input.

An example of such a text entry system 5, 5' is described in international patent application WO2010/112841, "System and method for inputting text into electronic devices", which is hereby incorporated by reference in its entirety. This reference also discusses a way in which predictions can be generated and combined from two or more language models, e.g. from the dynamic language model 1, 1' and one or more static language models 2, 2', which is described in further detail later.

Each dynamic language model 1, 1' is based on an n-gram language model that is updated to record the frequency of occurrence of n-gram paths input by a user in an n-gram map. An n-gram map is an associative map structure. In the n-gram map, terms in the vocabulary are associated with numerical identifiers (short integers) which are stored in the map and associated with frequency or probability values.

The dynamic language models of the devices 1, 1' have the ability to evolve over time to take into account two additional types of evidence. Firstly, the dynamic language model 1, 1' assimilates the statistical language data generated from a character sequence which has been entered by a user. Secondly, the dynamic language model 1, 1' assimilates the statistical language data of another language model. In this application, the assimilation of one language model of the statistical language data of another language model is referred to as 'merging'.

The dynamic language model assimilates the statistical language data generated from a character sequence which has been entered by a user in one of two ways: to include a term which is not previously present in a dynamic language model vocabulary, by inserting new paths into the n-gram map; and to update the frequency of an existing term in a particular n-gram context. The dynamic n-gram map stores the frequency at which n-gram paths are input by a user, wherein an 'n-gram path' refers to a particular term and up to n−1 terms of preceding context.

A first language model is merged with a second language model by adding the frequencies of occurrence for sequences in the data structure of the second language model to the frequencies of occurrence for the corresponding sequences in the data structure of the first language model. Furthermore, a new sequence and its corresponding frequency of occurrence is inserted into the data structure of the first language model, if that sequence is in the data structure of the second language model but not in the data structure of the first language model.

In order to limit the size of the dynamic language models, low probability events may be pruned from the dynamic language models, e.g. a path through the dynamic language model can be pruned if its frequency falls below a given threshold. Pruning occurs according to the following schema:

1) All event frequencies are decayed according to the following function:

$$f'=\text{int}(d*f)$$

2) All events whose frequencies fall below a pre-specified threshold are removed, i.e. where:

$$f'<t$$

where f is the original frequency, f' is the decayed frequency, int(x) is the greatest integer i such that i<x, d is the decay factor (set to, for example, 0.9) and t is the threshold (set to, for example, 1).

The language models 1, 1', 2, 2' are preferably built around the principle of predictive language model inference, in which the probability of a particular character sequence s is estimated given a contextual sequence c, and a model m, trained on historical sequential evidence to provide a probabilistic estimate of the form P(s|c, m). For the dynamic language model 1, 1' the model m evolves with time as the user enters text into the device 10, 10' (since the dynamic language model 1, 1' is progressively trained by the device 10, 10' on any text entered by the user into the device 10, 10').

Thus, with time, as the user enters text into a device 10, 10', the accuracy of the corrections and predictions generated by the text entry system 5, 5' should improve as the underlying dynamic language models 1, 1' evolve to the user's language style.

Figure 2:
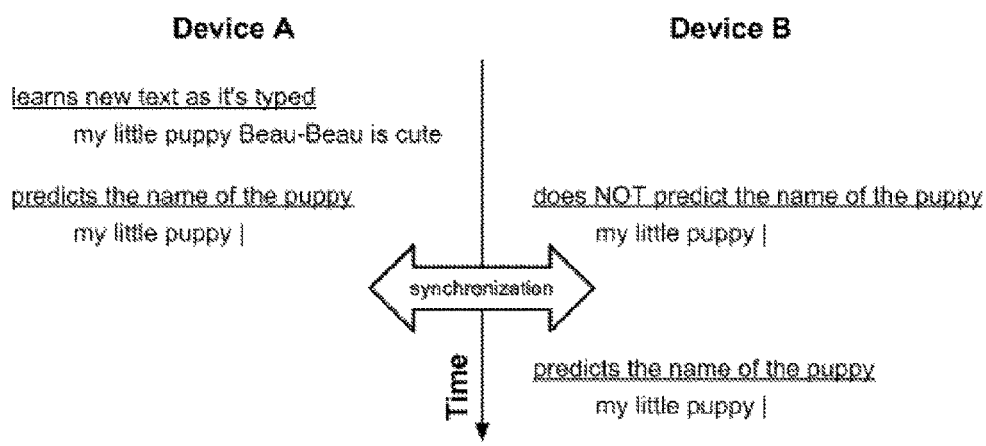
FIG. 2 illustrates an example of the predictions generated by two devices before and after synchronisation in accordance with the present invention.

FIG. 2 provides an example of a text entry experience that becomes consistent after synchronization. Prior to synchronization, Device B is unable to predict a term, which in this example is the name of a puppy "Beau-Beau", that Device A has learnt (through previous text entry into Device A). After synchronisation, Device B is also capable of predicting the name "Beau-Beau".

After synchronisation, all of the synchronised devices 10, 10' are capable of generating the same prediction in response to the same user input, by virtue of their synchronised dynamic language models 1, 1'. However, the devices 10, 10' may not actually generate the same text predictions, because each device 10, 10' may have dynamic language models that are initially trained on different texts, and may also optionally comprise one or more static language models 2 which do not evolve with user input and may be different in the different devices.

Since the text predictions are generated from the text entry system 5, 5' which may comprise the static language model(s) 2, 2' as well as the dynamic language model 1, 1, the text entry system 5 of a first device 10 may generate a different prediction to the text entry system 5' of a second device 10' which has had its dynamic language model 1' synchronised with that of the first device 10. A text entry system 5, 5' that combines predictions from a dynamic language model 1, 1' and one or more static language models 2, 2' is described in international patent application WO2010/112841, "System and method for inputting text into electronic devices", which is hereby incorporated by reference in its entirety. As described in this reference, a text prediction engine (e.g. a text entry system 5, 5') can be configured to generate concurrently text predictions from multiple language models. It does this by employing a multi-language model (Multi-LM) to combine the predictions sourced from each of the multiple language models to generate final predictions that are provided to a user interface for display and user selection. The final predictions are a set (i.e. a specified number) of the overall most probable predictions. The Multi-LM generates the final predictions by inserting the predictions from each language model into an ordered associative structure which may be an ordered STL 'multimap' structure.

By way of example, given the predictions "a"→0.2 and "the"→0.3 from a first language model, e.g. the dynamic language model 1 of the text entry system 5, and the predictions "an"→0.1 and "these"→0.2 from a second language model, e.g. a static language model 2 of the text entry system 5, the Multi-LM inserts these predictions into an ordered associative structure such that the entries are ordered by their probabilities ((0.1→"an"), (0.2→"a"), (0.2→"these"), (0.3 "the")). This structure can subsequently be read from the upper value end to obtain a set of final 'most probable' predictions.

Synchronisation of a plurality of devices with a central mechanism will now be discussed with references to FIGS. 3a-9.

Figure 3A:
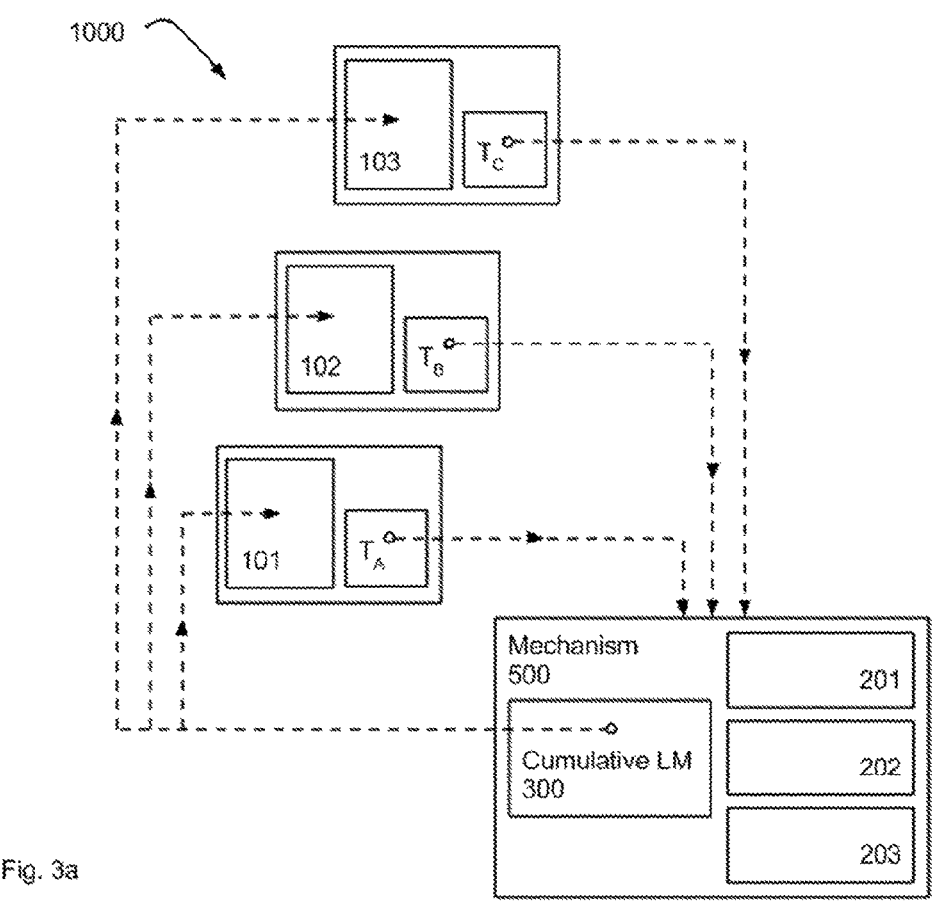
FIG. 3a illustrates data transfer during initial synchronisation of devices A, B and C in accordance with a first embodiment of the present invention.
Figure 3B:
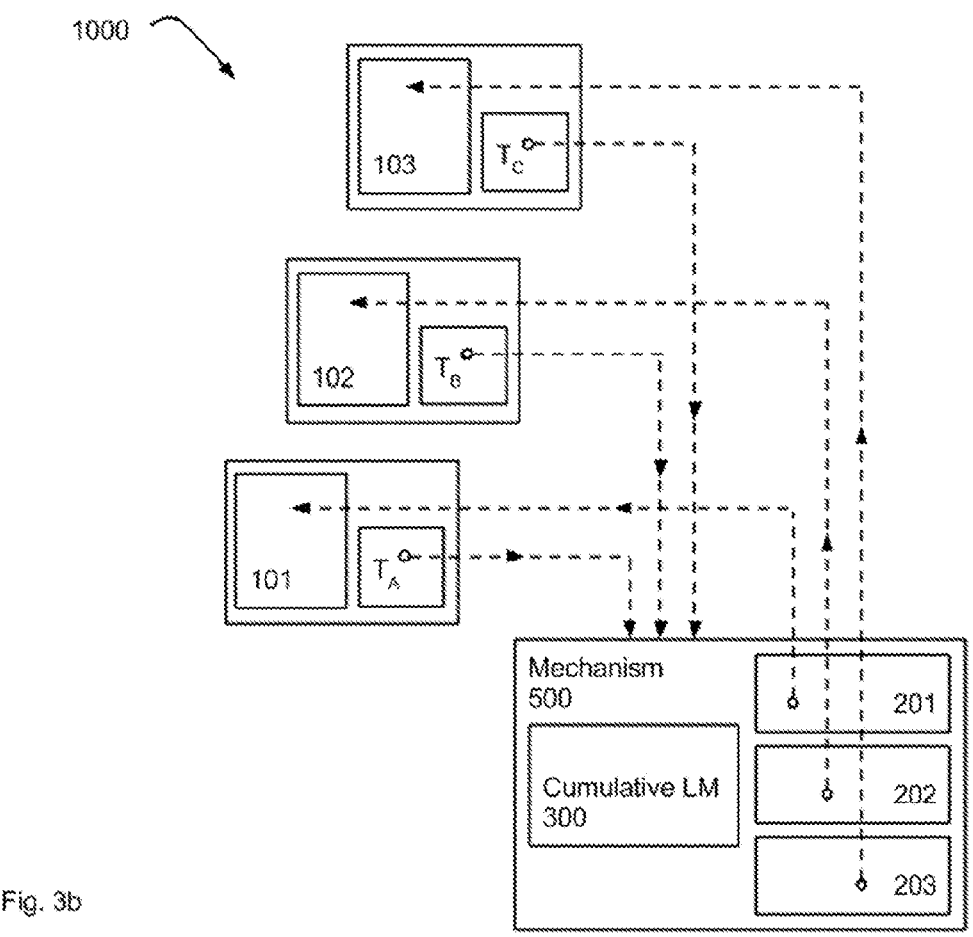
FIG. 3b illustrates data transfer during a subsequent synchronisation of devices A, B and C in accordance with a first embodiment of the present invention.

FIGS. 3a and 3b illustrate the transfer of data in a system 1000, whilst a mechanism 500 of the system 1000 synchronises with devices A, B and C in accordance with the present invention. Data transfer is illustrated by a dashed line starting (denoted by a circle) on the object that is being transferred and ending (denoted by solid arrow) on the object to which it is transferred. FIG. 3a illustrates data transfer during an initial synchronisation of the devices A, B, C with the mechanism 500. FIG. 3b illustrates data transfer during a subsequent synchronisation of the devices A, B, C with the mechanism 500. Synchronisation of all devices A, B, C of the system with the mechanism 500 provides for synchronisation of the plurality of language models residing in the devices.

The system 1000 shown in FIGS. 3a and 3b comprises three devices, A, B, C, each comprising a dynamic language model 101, 102, 103 and text $T_A$, $T_B$, $T_C$ that has been entered into the devices A, B, C by a user. The system is not limited to three devices; it can comprise a single device, two devices or any number of additional devices.

The system 1000 comprises a mechanism 500 for synchronising the devices A, B, C. The mechanism 500 comprises or creates a cumulative language model (LM) 300 and a delta language model 201, 202, 203 associated with each device A, B, C. The cumulative language model 300 is trained by the mechanism 500 on any text entered into the devices A, B, C. Each delta language model 201, 202, 203 is trained by the mechanism 500 using text $T_A$, $T_B$, $T_C$ entered into the devices A, B, C, other than the device specific to that delta language model, as will be described in greater detail below.

The devices A, B, C are free to synchronize with the mechanism 500 at any time and as often as desired/required. Each device A, B, C sends a request to the mechanism 500 for synchronisation, e.g. the devices control push/pull signals for synchronisation with the mechanism. In response to a request to synchronise, the synchronisation mechanism 500 synchronises with a single device A, B, C at a time. Thus the synchronisation mechanism 500 is configured to process in turn synchronisation requests from the devices A, B, C, in whatever order the requests for synchronisation are received.

The system 1000 illustrated in FIG. 3a, illustrates the data transfer between three devices A, B, C and a mechanism 500 for synchronising during an initial synchronisation of each device A, B, C. The devices can request synchronisation in any order, and thus the mechanism 500 can process the synchronisation of the devices in any order. For example, first device A may be synchronised with the mechanism 500 (initial synchronisation of device A), followed by device B is synchronising with the mechanism 500 (initial synchronisation of device B), and then device C is synchronising with the mechanism 500 (initial synchronisation of device C).

FIG. 3b illustrates data transfer during a subsequent synchronisation of the devices A, B, C. The term 'initial' synchronisation refers to the initial synchronisation of a single device and not an initial synchronisation of the plurality of devices, since the plurality of devices need not initially synchronise before subsequent synchronisation of one or more devices occurs. Similarly, 'subsequent' synchronisation refers to the subsequent synchronisation of a single device, i.e. a synchronisation that occurs after that device has performed initial synchronisation.

During an initial synchronization of a device, as shown in FIG. 3a, the device receives from the mechanism 500 a cumulative language model 300 that has been generated by the mechanism 500 using text that has been entered into any device that has previously synchronised with the mechanism 500. The device is configured to merge the cumulative language model 300 into to its own dynamic language model. The device is further configured to transmit to the mechanism 500 any text that has been entered into that device.

The initial synchronisation process is now described for the specific system illustrated in FIG. 3a, where, in a non-limiting example, devices A, B and C synchronise in turn with the mechanism 500.

During initial synchronisation of device A with the mechanism 500, the device A downloads the cumulative language model 300 from the mechanism 500. Since device A is the first to synchronise, the cumulative language model 300 is empty (since the cumulative language model 300 is trained with any text entered in any device that has previously been synchronised with the mechanism 500). After downloading the cumulative language model 300, device A merges it into its own dynamic language model 101. In this circumstance, the merging results in no change to the dynamic language model 101, since the cumulative language model 300 is empty. Device A then transmits the text $T_A$ that has been entered into the device A by the user. The text $T_A$ comprises any available text that has been entered into the device, e.g. text that is in a memory of the device and has not been erased.

During this initial synchronisation, the mechanism 500 preferably generates an empty cumulative language model 300, since it is the first time the user has performed a synchronisation. Alternatively, the mechanism 500 may be provided with an empty cumulative language model 300. The mechanism 500 receives the text $T_A$ entered into device A and trains the empty cumulative language model 300 on the text $T_A$. Furthermore, the mechanism 500 preferably creates an empty delta language model 201 for device A. For clarity, FIG. 3a does not show transfer of text within the mechanism 500. However, an example of the transfer of text within the mechanism 500 is illustrated for device C in FIG. 3c, and described below.

During initial synchronisation of device B with the mechanism 500, the device B downloads the cumulative language model 300 from the mechanism 500. The cumulative language model 300 represents the text $T_A$ that was entered into device A. After downloading the cumulative language model 300, device B merges it into its own dynamic language model 102. Device B then transmits the text $T_B$ that has been entered into the device B by the user to the mechanism 500.

The mechanism 500 transmits the cumulative language model 300 to the devices A, B, C before receiving the text $T_A$, $T_B$, $T_C$ entered into the devices. The dynamic language models 101, 102, 103 of the devices A, B, C evolve with user text entry. By transmitting the cumulative language model 300 first, the mechanism ensures that the devices A, B, C do not incorporate text $T_A$, $T_B$, $T_C$ that is already present in the dynamic language models 101, 102, 103. The importance of this order is discussed in further detail later.

During the initial synchronisation of device B, the mechanism 500 receives the text $T_B$ entered into device B and trains further the cumulative language model 300 on the text $T_B$. In addition, the mechanism 500 trains the delta language model 201 associated with device A on the text $T_B$ that it receives from device B. Furthermore, the mechanism 500 creates an empty delta language model 202 for device B.

During initial synchronisation of device C with the mechanism 500, the device C downloads the cumulative language model 300 from the mechanism 500. The cumulative language model 300 represents the text $T_A$, $T_B$ that was entered into devices A and B. After downloading the cumulative language model 300, device C merges it into its own dynamic language model 203. Device C then transmits the text $T_C$ that has been entered into the device C to the mechanism 500.

During this initial synchronisation of device C, the mechanism 500 receives the text $T_C$ entered into device C and trains further the cumulative language model 300 on the text $T_C$. In addition, the mechanism 500 trains further the delta language model 201 associated with device A on the text $T_C$ that it receives from device C. The mechanism 500 trains the empty delta language model 202 associated with device B on the text $T_C$ that it receives from device C. Furthermore, the mechanism 500 creates an empty delta language model 203 associated with device C.

Each device A, B, C preferably clears the text $T_A$, $T_B$, $T_C$ from the device once it has been transmitted to the mechanism 500. The device A, B, C then stores any text $T_A$, $T_B$, $T_C$ entered into the device since the initial synchronisation, which it then clears after this text has been transmitted during a subsequent synchronisation, etc.

Subsequent synchronisation of the devices A, B, C of the system is illustrated in FIG. 3b. As stated previously, the devices may synchronise whenever desired. There need not be any order to the synchronisation of the devices, for example device B could request a subsequent synchronisation before device C requests an initial synchronisation. Thus, in this example, the delta language model 203 that device C receives during synchronisation would be trained on two lots of text $T_B$ received from device B: that received during initial synchronisation of device B and that received during subsequent synchronisation of device B.

When a subsequent synchronisation is performed between the mechanism 500 and a device A, B, C, the device A, B, C transmits to the mechanism 500 any text $T_A$, $T_B$, $T_C$ that has been entered into that device since a previous synchronisation, where the previous synchronisation may be the initial synchronisation or a synchronisation subsequent to the initial synchronisation.

Each device A, B, C downloads the delta language model 201, 202, 203 specific to that device. The device can, and preferably does, download the delta language model at the same time as uploading the text, because the steps are independent (since the delta language model for a device is trained on the text entered into the other devices).

During the subsequent synchronisation, the mechanism 500 receives the text $T_A$, $T_B$, $T_C$ entered since the previous synchronisation. It is also transmits the delta language model 201, 202, 203 to its associated device A, B, C. The receipt of the text and the transmission of the delta language model can be carried out in parallel for a given device. After the delta language model has been transmitted to the device, the delta language model 201, 202, 203 can be cleared back to an empty delta language model.

The subsequent synchronisation of the devices shown in FIG. 3b is now discussed in detail with reference to this figure. To provide a working example, we consider the simple scenario where devices A, B and C request a subsequent synchronisation in that order, after the devices have all undergone initial synchronisation in that order (i.e. device A, followed by device B, followed by device C). However, as explained above, the devices can request synchronisation at any time and in any order. In a subsequent synchronisation of device A, the device A receives from the mechanism 500, the delta language model 201 specific to the device A. As described above, this delta language model 201 has been trained on the text $T_B$, $T_C$ entered into devices B and C which was uploaded during the initial synchronisation of devices B and C. Device A then merges the delta language model 201 into its dynamic language model 101.

The mechanism 500 preferably clears each delta language model once it has been transmitted to the associated device. Thus, after transmitting the delta language model 201 to device A, the mechanism 500 clears the delta language model 201, to provide an empty delta language model 201 which is subsequently trained on text $T_B$, $T_C$ entered into devices B and C since the initial synchronisation of devices B and C.

Device A, preferably but not necessarily at the same time as downloading the delta language model, transmits to the mechanism 500 the text $T_A$ that has been entered into device A since its initial synchronisation. The mechanism 500 receives this text $T_A$ and trains further the delta language models 202, 203 specific to devices B and C on this text $T_A$.

During subsequent synchronisation of device B, the delta language model 202 specific to device B is downloaded from the mechanism 500. The delta language model 202 has been trained on the text $T_C$ received by the mechanism 500 during initial synchronisation of device C and the text $T_A$ entered into device A since the initial synchronisation of device A. Device B merges the delta language model 202 into its dynamic language model 102. Once the mechanism 500 has transmitted the delta language model 202 to device B, it clears the language model 202 to provide an empty language model 202 that is subsequently trained on the text $T_A$, $T_C$ entered into devices A and C.

Device B transmits the text $T_B$ entered into device B since the previous synchronisation, e.g. since initial synchronisation in this scenario. Once transmitted, the device B preferably clears the text from its memory. The mechanism 500 receives the text $T_B$ and trains the cleared delta language model 201 for device A on the text $T_B$. Furthermore, the mechanism 500 trains further the delta language model 203 for device C on the text $T_B$, where the delta language model for device C has already been trained on the text $T_A$ entered into device A.

A similar synchronisation process as described above occurs for the subsequent synchronisation of device C. The delta language model 203 for device C is trained on text $T_A$, $T_B$ that has been entered into devices A and B since the initial synchronisation of devices A and C.

In addition to what has been described above, during a subsequent synchronisation, the mechanism 500 preferably trains and maintains the cumulative language model 300 on the text $T_A$, $T_B$, $T_C$ that it receives during a subsequent synchronisation of the devices A, B, C. This enables fast and efficient synchronisation of any further device with the mechanism 500, as will be explained more fully later.

Figure 3C:
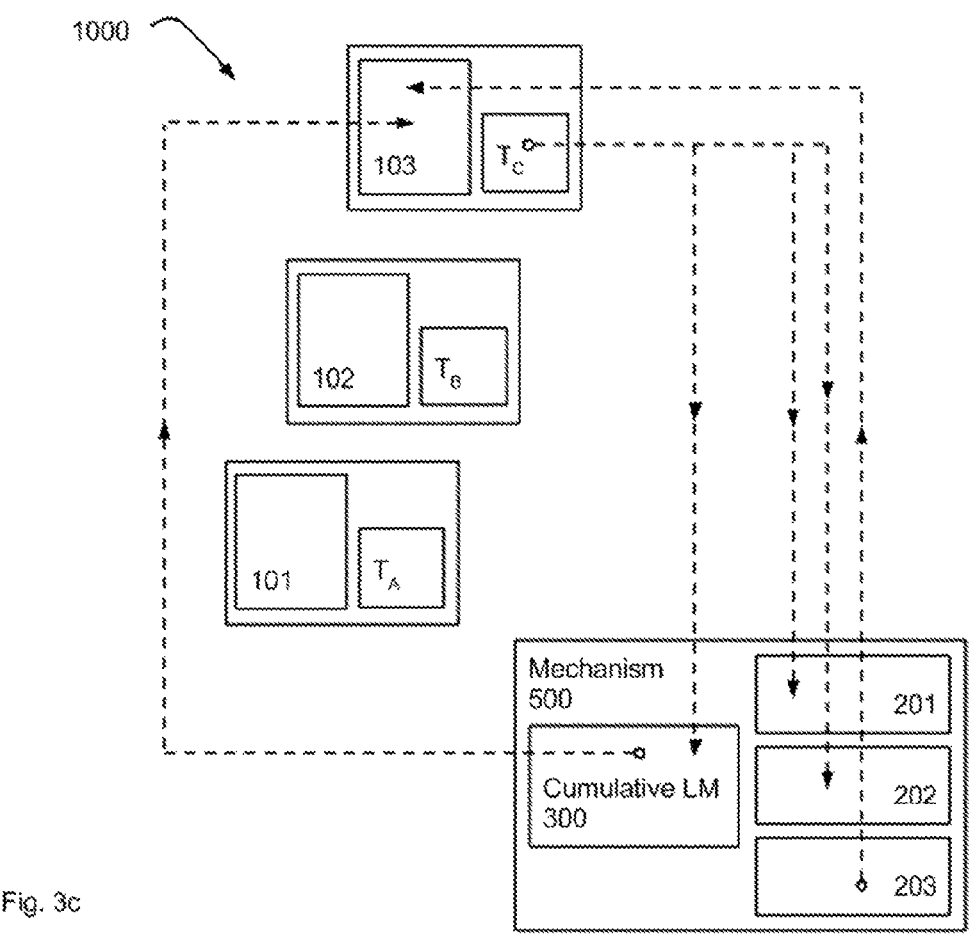
FIG. 3c illustrates data transfer during initial and subsequent synchronisation of device C in accordance with FIGS. 3a and 3b.

The transfer of data during initial and subsequent synchronisation for a particular device is illustrated for device C is FIG. 3C. During an initial synchronisation, device C downloads the cumulative language model 300 and merges it into its dynamic language model 103. Device C then uploads text $T_C$ entered into the device, which is used by the mechanism 500 to train the delta language models 201, 202 associated with devices A and B and to train the cumulative language model 300. During a subsequent synchronisation, device C downloads its delta language model 203 and merges it into its dynamic language model 103. The device C uploads to the mechanism 500 any text $T_C$ entered into the device C since the previous synchronisation, which the mechanism 500 uses to train the cumulative language model 300 and the delta language models 201, 202 associated with devices A and B.

When a device has synchronised with the mechanism, in accordance with the present invention, it is able to predict accurately a user's writing style because it has learnt from all the text entered into the other devices of the system, even if that device has never previously been used by the user.

As will be apparent form the above, when a new device, e.g. device D, is synchronised with the mechanism 500, it is not required to perform any special initial synchronisation. During initial synchronisation of device D with the mechanism 500 which is pre-synced with devices A, B and C, the device D will receive the cumulative language model 300 which has been trained on all text entered in devices A, B and C. Device D merges the cumulative language model 300 into its dynamic language model 103, thereby learning from all text entered into devices A, B and C. All other steps remain the same for synchronisation, e.g. during the initial synchronisation, the mechanism 500 creates an empty delta language model for device D, and during subsequent synchronisations, trains the delta language model on text $T_A$, $T_B$, $T_C$ entered into devices A, B and C.

As will be apparent for the above, the mechanism 500 preferably trains the language models with the text in the order in which text is received by the mechanism 500. For example, if device A synchronises with the mechanism 500 followed by device C synchronising, the delta language model for device B will be trained on the text $T_A$ received from device A and then the text $T_C$ received from device C.

In some embodiments, the relevant delta language models 201, 202, 203 and/or the cumulative language model 300 may not be trained on text $T_A$, $T_B$, $T_C$ when the text is received during synchronisation. In these embodiments the received text $T_A$, $T_B$, $T_C$ is stored by the mechanism 500 and used to train delta language models 201, 202, 203 and/or the cumulative language model 300 only when the language models are required to be transmitted to a device during a future synchronisation.

Figure 4A:
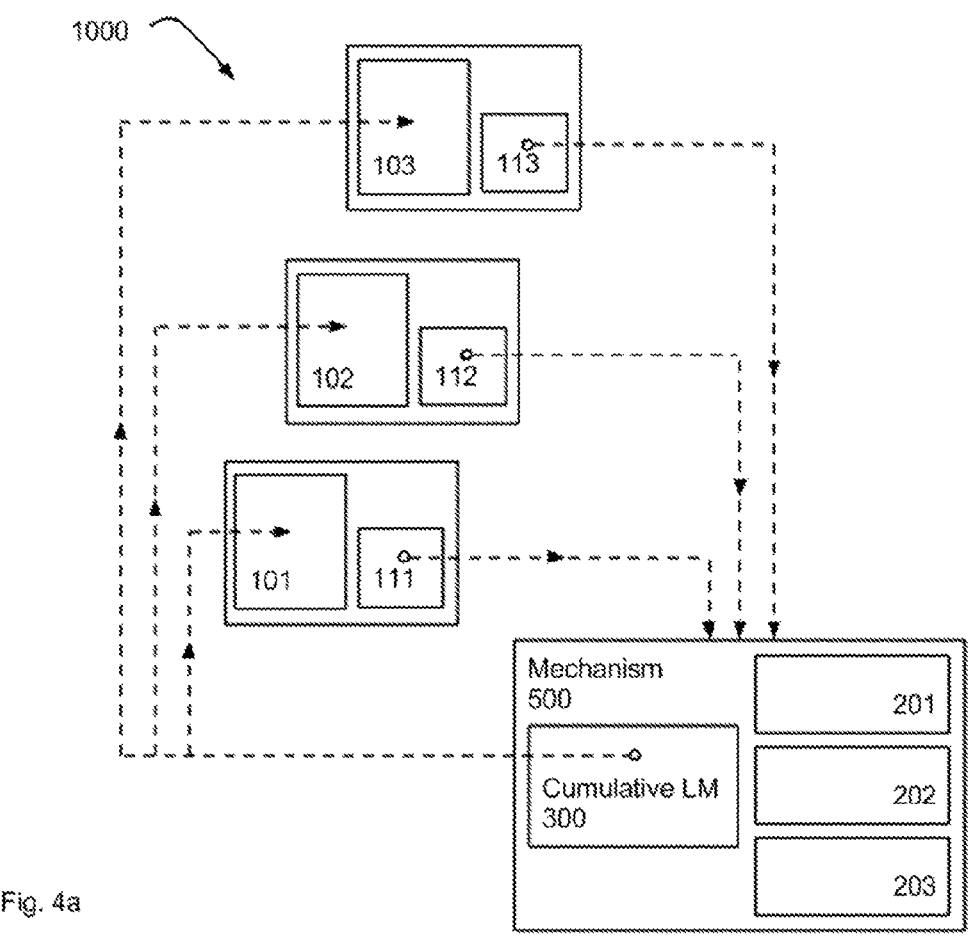
FIG. 4a illustrates data transfer during initial synchronisation of devices A, B and C in accordance with a second embodiment of the present invention.
Figure 4B:
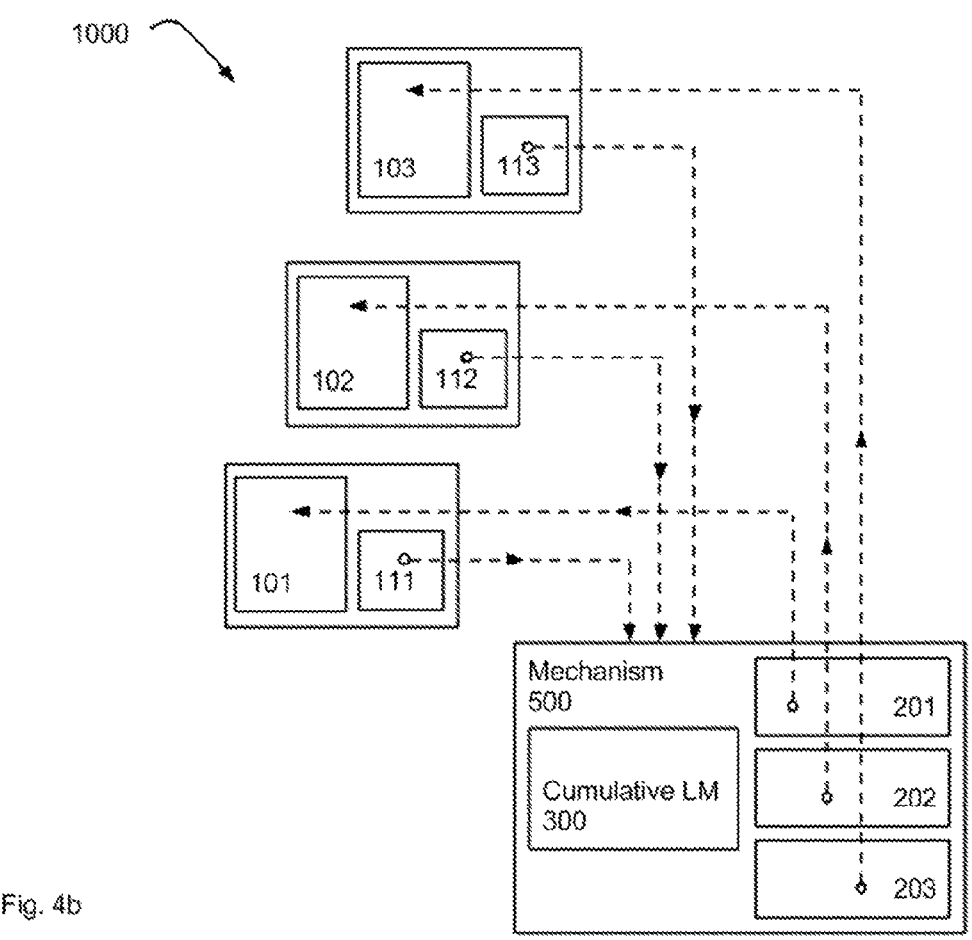
FIG. 4b illustrates data transfer during a subsequent synchronisation of devices A, B and C in accordance with a second embodiment of the present invention.
Figure 4C:
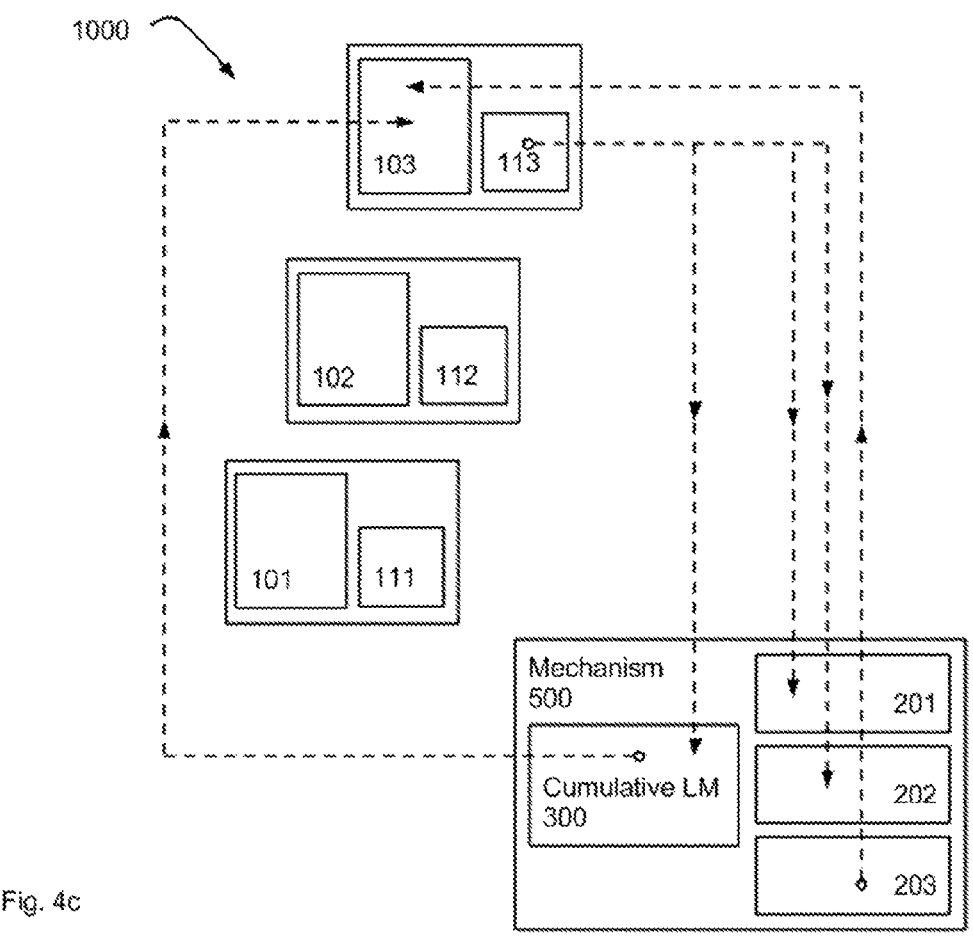
FIG. 4c illustrates data transfer during initial and subsequent synchronisation of device C in accordance with FIGS. 4a and 4b.

An alternative data transfer embodiment in accordance with the present invention is illustrated in FIGS. 4a, 4b and 4c. This alternative embodiment is substantially similar to the embodiment described above with reference to FIGS. 3a, 3b and 3c, but allows the synchronisation of devices A, B, C to be achieved by the transfer of device delta language models 111, 112, 113 from the devices A, B, C to the mechanism, rather than the transfer of the raw text $T_A$, $T_B$, $T_C$ that has entered into the devices by the user. Device delta language models 111, 112, 113 are dynamic language models stored on the devices A, B, C, in contrast to the delta language models 201, 202, 203 which are specific to the devices A, B, C but stored in the mechanism 500.

FIGS. 4a and 4b illustrate the transfer of data in a system 1000, whilst a mechanism 500 of the system 1000 synchronises with devices A, B and C. FIG. 4a illustrates data transfer during an initial synchronisation of the devices A, B, C with the mechanism 500. FIG. 4b illustrates data transfer during a subsequent synchronisation of the devices A, B, C with the mechanism 500. Synchronisation of all devices A, B, C of the system with the mechanism 500 provides for synchronisation of the plurality of language models residing in the devices.

The system 1000 shown in FIGS. 4a and 4b comprises three devices, A, B, C, each comprising a dynamic language model 101, 102, 103 and a device delta language model 111, 112, 113. The system is not limited to three devices; it can comprise a single device, two devices or any number of additional devices.

The device delta language models 111, 112, 113 are dynamic language models trained on the text inputted on the relevant device A, B, C since the last synchronisation of that device with the mechanism 500, i.e. the device delta language models 111, 112, 113 are trained on the raw text $T_A$, $T_B$, $T_C$ inputted on the relevant device A, B, C since the last synchronisation of that device with the mechanism 500.

The system 1000 comprises a mechanism 500 for synchronising the devices A, B, C. The mechanism 500 comprises or creates a cumulative language model (LM) 300 and a delta language model 201, 202, 203 associated with each device A, B, C. The mechanism 500 merges device delta language models 111, 112, 113 representing any text entered into the devices A, B, C into the cumulative language model 300.

During synchronisation, each device delta language model 111, 112, 113 is merged by the mechanism 500 into all delta language models 201, 202, 203 other than the delta language model 201, 202, 203 specific to the device A, B, C from which the device delta language model 111, 112, 113 originates, as will be described in greater detail below.

The devices A, B, C are free to synchronize with the mechanism 500 at any time and as often as desired/required. The system 1000 illustrated in FIG. 4a illustrates the data transfer between three devices A, B, C and a mechanism 500 for synchronising during an initial synchronisation of each device A, B, C. The devices can request synchronisation in any order.

During an initial synchronization of a device, as shown in FIG. 4a, the device receives from the mechanism 500 a cumulative language model 300 that has been generated by the mechanism 500 using data derived from text that has been entered into any device that has previously synchronised with the mechanism 500. The device is configured to merge the cumulative language model 300 into to its own dynamic language model. The device is further configured to transmit to the mechanism 500 a device delta language model 111, 112, 113 which comprises data from any text that has been entered into that device.

The initial synchronisation process is now described for the specific system illustrated in FIG. 4a, where, in a non-limiting example, devices A, B and C synchronise in turn with the mechanism 500.

During initial synchronisation of device A with the mechanism 500, the device A downloads the cumulative language model 300 from the mechanism 500. and merges it into its own dynamic language model 101. Device A then transmits a device delta language model 111, which has been trained on the text that has been entered into the device A by the user. The device delta language model 111 may be trained on any available text that has been entered into the device, e.g. text that is in a memory of the device and has not been erased.

During this initial synchronisation, the mechanism 500 preferably generates an empty cumulative language model 300, or the mechanism 500 may be provided with an empty cumulative language model 300. The mechanism 500 receives the device delta language model 111 and merges the device delta language model into the empty cumulative language model 300. Furthermore, the mechanism 500 preferably creates an empty delta language model 201 specific to device A.

During initial synchronisation of device B with the mechanism 500, the device B downloads the cumulative language model 300 from the mechanism 500. The cumulative language model 300 comprises data from the device delta language model 111 trained on the text that was entered into device A. After downloading the cumulative language model 300, device B merges it into its own dynamic language model 102. Device B then transmits the delta language model 112 which has been trained on the text that has been entered into the device B by the user to the mechanism 500.

During the synchronisation of each device, he mechanism 500 transmits the cumulative language model 300 to the device A, B, C before receiving the device delta language model 111, 112, 113 which was trained on the text entered into the device. By transmitting the cumulative language model 300 first, the mechanism ensures that the devices A, B, C do not incorporate data from the device delta language models 111, 112, 113 that is already present in the dynamic language models 101, 102, 103. The importance of this order is discussed in further detail later.

During the initial synchronisation of device B, the mechanism 500 receives the device delta language model 112 which has been trained on the text entered into device B and merges the device delta language model 112 with the cumulative language model 300. In addition, the mechanism 500 merges the device delta language model 112 received from device B with the delta language model 201 associated with device A. Furthermore, the mechanism 500 creates an empty delta language model 202 for device B.

During initial synchronisation of device C with the mechanism 500, the device C downloads the cumulative language model 300 from the mechanism 500. The cumulative language model 300 represents the text that was entered into devices A and B. After downloading the cumulative language model 300, device C merges it into its own dynamic language model 203. Device C then transmits a delta language model 113 which has been trained on the text that has been entered into the device C by the user to the mechanism 500.

During this initial synchronisation of device C, the mechanism 500 receives the device delta language model 113 which was trained on the text entered into device C and merges the delta language model 113 with the cumulative language model 300. In addition, the mechanism 500 merges the device delta language model 113 received from device C with the delta language model 201 associated with device A. The mechanism 500 further merges the device delta language model 113 received from device C with the empty delta language model 202 associated with device B. Furthermore, the mechanism 500 creates an empty delta language model 203 associated with device C.

Each device A, B, C preferably clears the device delta language model 111, 112, 113 to an empty device delta language model once it has been transmitted to the mechanism 500. The device A, B, C then trains the device delta language model 111, 112, 113 on any text entered into the device since the initial synchronisation. The device delta language model 111, 112, 113 is cleared again after it has been transmitted during a subsequent synchronisation, etc.

Subsequent synchronisation of the devices A, B, C of the system is illustrated in FIG. 4b. As stated previously, the devices may synchronise whenever desired and there need not be any order to the synchronisation of the devices.

When a subsequent synchronisation is performed between the mechanism 500 and a device A, B, C, the device A, B, C transmits to the mechanism 500 the device delta language model 111, 112, 113 which has been trained on any text that has been entered into that device since a previous synchronisation.

Each device A, B, C downloads the delta language model 201, 202, 203 specific to that device. The device can, and preferably does, download the delta language model 201, 202, 203 at the same time as uploading the device delta language model 111, 112, 113.

During the subsequent synchronisation, the mechanism 500 receives the device delta language model 111, 112, 113 which represents the text entered on that device A, B, C since the previous synchronisation. It is also transmits the delta language model 201, 202, 203 to its associated device A, B, C. The receipt of the device delta language model 111, 112, 113 and the transmission of the delta language model 201, 202, 203 can be carried out in parallel for a given device. After the delta language model 201, 202, 203 has been transmitted to the device, the delta language model 201, 202, 203 can be cleared back to an empty delta language model.

The subsequent synchronisation of the devices shown in FIG. 4b is now discussed in detail with reference to this figure, where we consider the same scenario as in FIG. 3b, where devices A, B and C request a subsequent synchronisation in that order, after the devices have all undergone initial synchronisation in that order. However, as explained above, the devices can request synchronisation at any time and in any order. In a subsequent synchronisation of device A, the device A receives from the mechanism 500 the delta language model 201 specific to the device A (which is the device delta language model 112 representing text entered into device B since the last synchronisation of device A merged with the device delta language model 113 representing text entered into device C since the last synchronisation of device A) and merges the delta language model 201 into its dynamic language model 101.

The mechanism 500 preferably clears each delta language model 201, 202, 203 once it has been transmitted to the associated device.

Device A, preferably but not necessarily at the same time as downloading the delta language model, transmits to the mechanism 500 the device delta language model 111 which has been trained on the text that has been entered into device A since its initial synchronisation. The mechanism 500 receives this device delta language model 111 and merges the device delta language model 111 into the delta language models 202, 203 specific to devices B and C.

During subsequent synchronisation of device B, the delta language model 202 specific to device B is downloaded from the mechanism 500 and merged into its dynamic language model 102. Once the mechanism 500 has transmitted the delta language model 202 to device B, it clears the language model 202.

Device B transmits the device delta language model 112 trained on the text entered into device B since the previous synchronisation, e.g. since initial synchronisation in this scenario. Once transmitted, the device B preferably clears the device delta language model 112 to create an empty delta language model. The mechanism 500 receives the device delta language model 112 and merges the device delta language model 112 into the cleared delta language model 201 for device A. Furthermore, the mechanism 500 merges the device delta language model 112 into the delta language model 203 for device C, where the delta language model 203 for device C already comprises data derived from the text entered into device A.

A similar synchronisation process as described above occurs for the subsequent synchronisation of device C.

In addition to what has been described above, during a subsequent synchronisation, the mechanism 500 preferably maintains the cumulative language model 300 by merging the device delta language models 111, 112, 113 that it receives during subsequent synchronisations of the devices A, B, C.

The transfer of data during initial and subsequent synchronisation for a particular device is illustrated for device C in FIG. 4C. During an initial synchronisation, device C downloads the cumulative language model 300 and merges it into its dynamic language model 103. Device C then uploads the device delta language model 113 trained on the text entered into the device. The mechanism 500 merges the device delta language model 113 into the delta language models 201, 202 associated with devices A and B and into the cumulative language model 300. During a subsequent synchronisation, device C downloads its delta language model 203 and merges it into its dynamic language model 103. The device C uploads to the mechanism 500 the device delta language model 113 trained on any text entered into the device C since the previous synchronisation, which the mechanism 500 merges into the cumulative language model 300 and the delta language models 201, 202 associated with devices A and B.

As will be apparent from the above, when a new device, e.g. device D, is synchronised with the mechanism 500, it is not required to perform any special initial synchronisation.

The mechanism 500 preferably merges the device delta language models 111, 112, 113 into the language models in the order in which device delta language models 111, 112, 113 are received by the mechanism. For example, if device A synchronises with the mechanism 500 followed by device C synchronising, the device delta language model 111 received from device A will be merged into the delta language model 202 for device B and then the device delta language model 113 received from device C will be merged into the delta language model 202.

In the above-described aspect of the invention, where delta language models are transmitted to the mechanism instead of input text, the dynamic language model of the device and the device delta language model may be trained on text input by the user. In preferred embodiments this training occurs simultaneously. If both the dynamic language model and delta language model are trained on the input text immediately after input, there is no requirement to store the actual text input by the user.

In alternative embodiments, the text input since the last synchronisation may be stored on the device, and the device delta language model may be trained before the subsequent synchronisation in which the device delta language model is transferred.

In a variation of the above embodiments, the device delta language models 111, 112, 113 may not be merged into the relevant delta language models 201, 202, 203 and/or the cumulative language model 300 when the device delta language model 111, 112, 113 is received during synchronisation. Instead, the received device delta language model 111, 112, 113 may be stored by the mechanism 500 and merged into delta language models 201, 202, 203 and/or the cumulative language model 300 only when the resultant language models are required to be transmitted to a device during a future synchronisation.

A possible advantage of transmitting a language model instead of text is the increased privacy and security through obfuscation in both data transmission and storage. In certain scenarios the storage and transmission data size may be reduced by using language models instead of text, for example when the amount of user inputted text is large, or when there are many repeated words. However, the opposite may also be true, in that the storage and transmission data size may be reduced by using text instead of language models, for example when the amount of user inputted text is small, or there are few repeated words. A possible further advantage of transmitting language models is that it enables the initialisation process to be performed on the device rather than by the mechanism as will be described in more detail below.

In either embodiment described above, each device requests synchronisation with the mechanism 500 when synchronisation is desired or required. The trigger for requesting synchronisation could lie with the user, who decides to instigate synchronisation of a device. Alternatively, or in addition, each device can be configured to periodically request synchronisation, to ensure that a minimum level of updating occurs. The frequency at which the devices update need not be the same. In one embodiment, the devices could be configured to trigger synchronisation whenever new text is added into the device.

In the preferred embodiments described above, it is the devices that control synchronisation. In an alternative embodiment, the mechanism could be configured to trigger synchronisation, the mechanism sequentially synchronising the plurality of devices.

Figure 5:
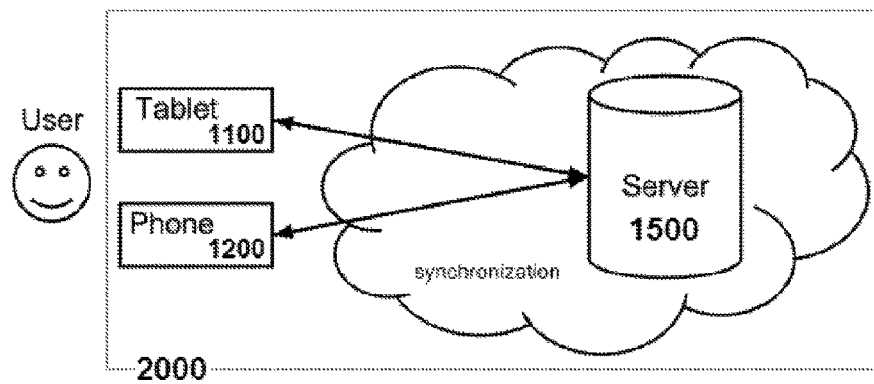
FIG. 5 illustrates a preferred embodiment of the present invention, in which a mechanism for synchronising a plurality of language models is server-based.

In a preferred embodiment of the present invention, the mechanism for synchronising is a server 1500. A webservice/the cloud is able to provide easily accessible synchronisation between a plurality of devices and the server 1500. FIG. 5 illustrates a system in accordance with the present invention, the system 2000 comprising a server 1500 and two devices 1100, 1200 to be synchronised (a tablet 1100 and a phone 1200). Thus, during initial synchronization of a device, the device downloads a cumulative language model from the server 1500 and uploads text to the server. During a subsequent synchronization of a device, the text that was entered on the device 1100, 1200 since last synchronization is uploaded onto the server and used for training the cumulative and delta language models. In the alternative embodiment as described in relation to FIGS. 4a-4a, the device uploads a device delta language model trained on the text entered on the device 1100, 1200 since last synchronization onto the server during synchronisation, and this device delta language model is merged into the cumulative language model and the delta language models. Each device 1100, 1200 will also download from the server 1500 its specific delta language model which describes the text entered on all other devices since last synchronisation.

The text that a user enters into a device represents sensitive information, the security of which should not be compromised. The present system provides a number of solutions to ensure that the security of the text is not compromised, either during local storage or transmission between the plurality of devices and the mechanism.

In embodiments where text is transferred from the device to the mechanism, the actual text, as entered by a user, is preferably sent via a secure connection, e.g. over an encrypted communication channel, to ensure the security of this text is not compromised during transmission. Likewise, a secure connection may be established between the mechanism and device in order to transmit the delta and cumulative language models from the mechanism to each of the plurality of devices.

An inherent property of the system 1000, 2000 of the present invention is that the mechanism 500, 1500 stores and transmits updates in the form of a cumulative language model or delta language models which do not comprise the actual text. Therefore, even if the secure connection is compromised, only a language model (which is a probabilistic encapsulation of the user's language style) is exposed and not the text itself. Thus, although preferable, a secure connection is not necessary for transferring the delta (device delta language model and delta language model of the mechanism) and cumulative language models.

The synchronisation of a plurality of dynamic language models, in a system comprising a web-based server, is now discussed from the perspective of both the device and server.

Figure 6:
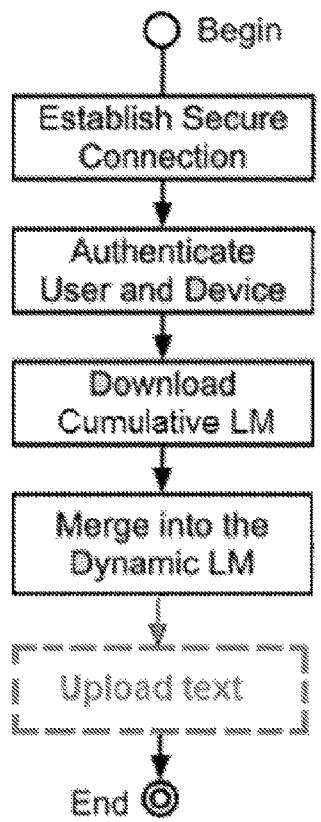
FIG. 6 illustrates initial synchronisation of a device with a server from the device's perspective.
Figure 7:
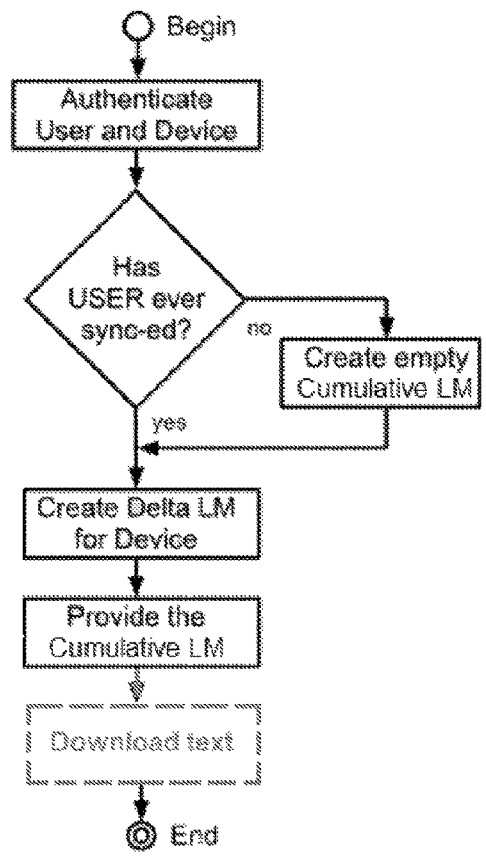
FIG. 7 illustrates initial synchronisation of a device with a server from the server's perspective.
Figure 8:
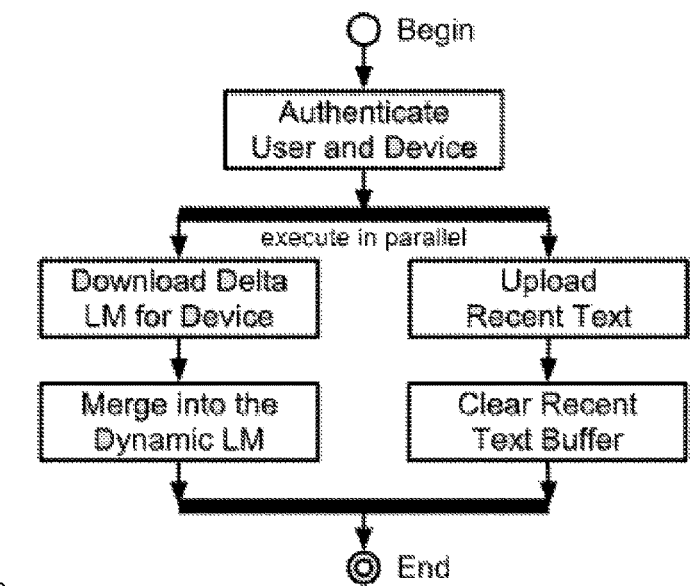
FIG. 8 illustrates subsequent synchronisation of a device with a server from the device's perspective.
Figure 9:
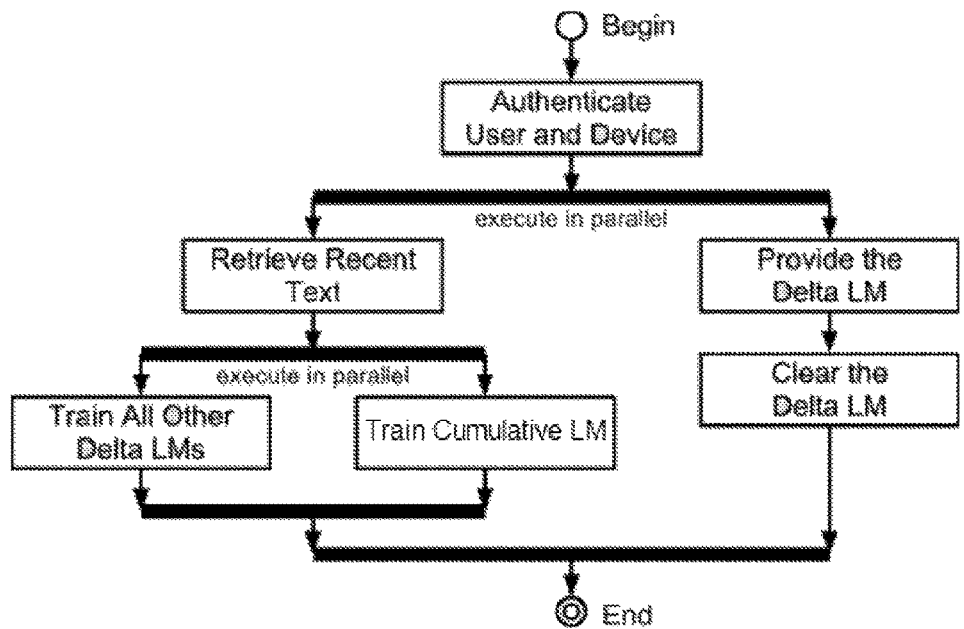
FIG. 9 illustrates subsequent synchronisation of a device with a server from the server's perspective.

FIGS. 6 and 7 illustrate initial synchronisation, from the perspective of a device and server, and FIGS. 8 and 9 illustrate subsequent synchronisation, from the perspective of a device and server.

FIG. 6 illustrates an initial synchronisation from the perspective of the device. After requesting synchronisation and establishing a secure connection between the device and server, the user preferably authenticates (e.g. by request for and provision of a password) in order to synchronise dynamic language models specific to the user.

The device then downloads the cumulative language model from the server and merges the cumulative language model into its existing dynamic language model. If text has been entered into the device prior to synchronisation, the device is configured to upload text data representing the text that has been entered into that device after it has downloaded the cumulative language model. The data representing text entered on the device may comprise the actual text, as described above with reference to FIGS. 3a, 3b and 3c, and as shown in FIG. 6, or may comprise device delta language models, as described with reference to FIGS. 4a, 4b and 4c.

Initial synchronization from server perspective is illustrated in FIG. 7. Initial synchronisation consists of preparing the server for subsequent synchronizations with the device and providing the device with the cumulative language model representing all text that has been entered so far on all devices that have previously synced with the server.

The server authenticates the user and the device and, if it is the first synchronization for the current user, the server creates an empty cumulative language model. This empty cumulative language model is later trained on all text entered into the devices, as described in detail above with reference to FIGS. 3a and 3b. In the other embodiment described with reference to FIGS. 4a and 4b, device delta language models representing all text entered into the devices are merged into the cumulative language model.

During the initial synchronization for a device, the server is also configured to create an empty delta language model for that device, which will be trained with text entered onto the other devices and received by the server during a previous synchronisation of the other devices, as described in relation to FIGS. 3a and 3b. In the other embodiment, as described in detail with reference to FIGS. 4a and 4b, device delta language models representing all text entered into the other devices are merged into the delta language model.

The server then provides the cumulative language model to the device. If it is the first synchronisation for the user, the server provides the device with an empty cumulative language model, as described above for device A of FIG. 3a or FIG. 4a. Alternatively, if synchronisation of other devices has already taken place, the server provides the device with a cumulative language model that has been trained on the text data received during synchronisation of the other devices.

The server then uploads text data representing the text (if any) that has been entered into the device. The text data is uploaded after the cumulative language model has been provided to the device, to ensure the uploaded text is not incorporated into the cumulative language model provided to the device.

A subsequent synchronization from the device perspective (in the embodiment in which the device transfers text during synchronisation) is illustrated in FIG. 8. As with the case for initial synchronisation, the device must first establish a secure connection with the server and the user must authenticate. The server also authenticates the device, enabling the devices to be distinguished from one another, in order to generate the delta language models (since a specific delta language model is associated with each device, requiring the server to distinguish the devices and the text data representing text entered into those devices). The device may authenticate with the server by providing a key unique to that device, in response to a request for the key from the server.

As illustrated in FIG. 8, each device uploads to the server any text that has been entered into that device since the last synchronisation event. Preferably, the device is configured to clear the text buffer after it has uploaded the text to the server. In the alternative embodiment, each device uploads to the server the device delta language model and clears this device delta language model after it has been uploaded.

The device is also configured to download its specific delta language model from the server and merge the delta language model into its dynamic language model. Thus, in a subsequent synchronisation, each device learns statistical language data (in the form of its specific delta language model) generated from text data representing input text received by the server from the other devices during a previous synchronisation of the other devices.

As shown in FIG. 8, the two tasks of uploading text data representing recent text and downloading a delta language model are completely independent, since the delta language model specific to a device is generated from the text data representing text entered into all of the other devices. Thus, these two tasks can be executed in parallel.

The subsequent synchronisation of a device from the server perspective is illustrated in FIG. 9. After receiving a request for synchronisation, establishing a secure connection, and authenticating the user and the device, the server is configured to carry out two independent tasks, preferably in parallel. In one task it retrieves text data representing the text entered into the device since the last synchronisation. Where the data comprises the actual input text, as is illustrated in FIG. 9, this text is used to train the delta language models associated with the other devices in the system. Preferably, this text is also used to train the cumulative language model which is trained on all text entered into all devices. By training a cumulative language model with all updates as they occur, the server is able to more rapidly and efficiently synchronise any additional device with the pre-synchronised devices. The server is preferably configured to train the delta language models and the cumulative language model in parallel. In the second task the server provides to the device, the delta language model specific to that device. Preferably, the server clears the delta language model once it has been provided to the device.

Alternatively, in the embodiment where the data comprises a device delta language model, the device delta language model is merged into the delta language models associated with the other devices in the system. Preferably, the delta language model is also merged into the cumulative language model which represents all text entered into all devices. By merging the device delta language models into a cumulative language model as each synchronisation occurs, the server is able to more rapidly and efficiently synchronise any additional device with the pre-synchronised devices. The server is preferably configured to merge the device delta language models into the delta language models and the cumulative language model in parallel. In the second task the server provides to the device, the delta language model specific to that device. Preferably, the server clears the delta language model once it has been provided to the device.

One of the concerns of synchronization is that the dynamic language models are prone to becoming biased by increasing the strength of certain statistical language data unnaturally as a side effect of repeated merging. The mechanism of the present invention addresses this problem by ensuring that, during synchronisation of a device, the dynamic language model learns terms and sequences of terms that have been input into the other devices of the system, without ever relearning the statistical language data that is already present within its own dynamic language model. To achieve this, during initial synchronisation of a device, the mechanism transfers the cumulative language model to the device before uploading any text data representing input text from that device, to ensure the device does not receive text data representing text that has already been entered into that device. Similarly, during subsequent synchronisation, the mechanism generates delta language models specific to the device, using text data representing text entered into all devices except the device for which the delta language model is intended. Thus, the synchronisation mechanism of the present invention ensures that the dynamic language models do not receive and merge statistical data already present in the dynamic language models.

If the biasing of the dynamic language models 101, 102, 103 is not of concern, in the first embodiment, the mechanism 500 could be configured to train a cumulative language model 300 on the text $T_A$, $T_B$, $T_C$ received from all of the devices during initial and subsequent synchronisations, and provide the cumulative language model 300 to each device during initial and subsequent synchronisations, i.e. the mechanism comprises no delta language models, the devices synchronising individually or collectively. Similarly, in the other embodiment, the mechanism 500 could be configured to merge device delta language models received from all of the devices during initial and subsequent synchronisations into a cumulative language model 300, and provide the cumulative language model 300 to each device during initial and subsequent synchronisations, i.e. the mechanism comprises no delta language models, the devices synchronising individually or collectively. In another embodiment, the mechanism can be configured to carry out collective initial synchronisation of the devices, with subsequent synchronisation carried out individually for each device by downloading a delta language model for that device, thereby limiting the biasing to occasions when a device performs initial synchronisation, e.g. when a new device is synchronised with the system.

The above description details preferred embodiments of the invention, in which the mechanism generates a cumulative language model in addition to a plurality of delta language models. However, in another embodiment, the mechanism may generate the plurality of delta language models only. This embodiment will differ from the preferred embodiment described above with respect to FIGS. 3a, 3b, 4a and 4b in that all of the devices will learn the initial text from the other devices via their associated delta language models, rather than from the cumulative language model. Any new device introduced into a pre-synced system will learn only from text entered into the pre-synced devices since a previous synchronisation in addition to any future text entered into those devices. This may be acceptable, since the newest text entered by the user may be the most relevant text for the device to learn. Furthermore, there will be no biasing of the statistical language data in such a system. However, it does mean that the new device will take longer to learn the user's writing style, because it will not assimilate all of the statistical language data of the system.

The above description details embodiments of the invention in which devices include a single dynamic language model. However, in other embodiments one or more device (all devices in some embodiments) may employ multiple dynamic language models. To facilitate this, each dynamic language model is tagged uniquely. That is to say, each dynamic language model within a device is tagged so as to identify it within the device. An example is as follows. A device has a dynamic language model in respect of email text, and another in respect of twitter text. Each of these language models will be tagged so as to identify the one from the other. The tagging may take the form of a string, such as a text string like "email", "twitter", "facebook" etc. The tag may be stored in the device in any suitable way.

Where at least one device employs multiple dynamic language models, the mechanism synchronises dynamic language models from different devices and with the same tags. That is to say, if a device X has an email dynamic language model and a twitter dynamic language model as mentioned in the preceding paragraph, and a device Y has only an email dynamic language model, then the email dynamic language model in both devices will have associated with it the same tag. The mechanism, recognising these tags, will synchronise dynamic language models having the same tag.

In this embodiment, there will also be provided a dispatcher module associated with the mechanism and the mechanism will comprise a number of instances, one associated with each tag, or will take the form of a number of separate mechanisms. Each tag, along with other data from the associated dynamic language model, will be provided to the dispatcher module (in the manner described above in respect of provision of data to the mechanism) by each device during synchronisation. Upon receipt of such data, the dispatcher module identifies and analyses the tag within the data.

The tag will also be stored, preferably in a map, in or associated with the dispatcher module. In this scenario the tag is a key into the map. Hence, upon identification of the tag, the dispatcher module performs analysis which takes the form of ascertaining whether the identified tag exists in the map. If it does not, a new instance of the mechanism or a new mechanism is created by the dispatcher module and associated in the map with the tag in question. Data received along with the tag is then directed to the new mechanism instance or new mechanism for handling as described in previous embodiments. If the tag does exist in the map, then the dispatcher module directs the data associated with the tag to the mechanism instance or mechanism that is associated with the tag, which it identifies from the map. The data is then processed by the mechanism instance or mechanism as described in previous embodiments.

In the example given above in respect of this embodiment, synchronisation will result in a cumulative language model (email), a delta language model (email) for device X and a delta language model (email) for device Y. Device Y does not have a twitter dynamic language model and so does not synchronise in respect of the twitter dynamic language model. Synchronisation therefore also results in a cumulative language model (twitter) and a delta language model (twitter) for device X. As can be appreciated readily, there is therefore an email mechanism instance and a twitter mechanism instance (or separate email and twitter mechanisms) in this example.

If the device Y also had a twitter dynamic language model, the synchronisation would extend as discussed for the email scenario such that there would result in addition to the above cumulative language model (twitter) and delta language model (twitter) for device X, a delta language model (twitter) for device Y. This extends such that all possible dynamic language models that may be present within a device may be synchronised with their equivalents in other devices. As can be seen readily, synchronisation according to the invention and as described above extends to the multiple dynamic language model per device scenario by identifying language models using the device from which they originate and an additional tag, and synchronising dynamic language models from different devices but which have identical tags in the manner already described.

The synchronization process of the present invention is lightweight and efficient in terms of on-device computation in order to prevent performance issues. It is highly scalable, allowing a potentially high number of diverse devices (running different operating systems or software version) to synchronize, at different time intervals. As stated above, frequency of synchronization may vary from device to device, e.g. device A may be synced more regularly with the system 1000 than device B or C.

The preceding description discusses synchronisation of a plurality of devices after and/or during use of the devices by a user. However, before the user has had chance to enter a lot of text into the devices of the synchronised system, the text predictions generated by the devices may not be very accurate for the user, because the dynamic language models will not have learned the user's writing style.

To increase the accuracy of the text predictions for a user, the dynamic language models of the devices of the synchronising system can, preferably, be trained with any text that has been entered by the user on any device which is outside of the devices of the synchronising system, e.g. emails that are stored on a user's PC, where that PC is not one of the devices of the system. This learning process is named 'initialisation'.

An external mechanism, which is outside of the synchronising system, is configured to generate one or more initialisation language models by training one or more language models on text that the user has entered into devices outside of the synchronising system.

Figure 10:
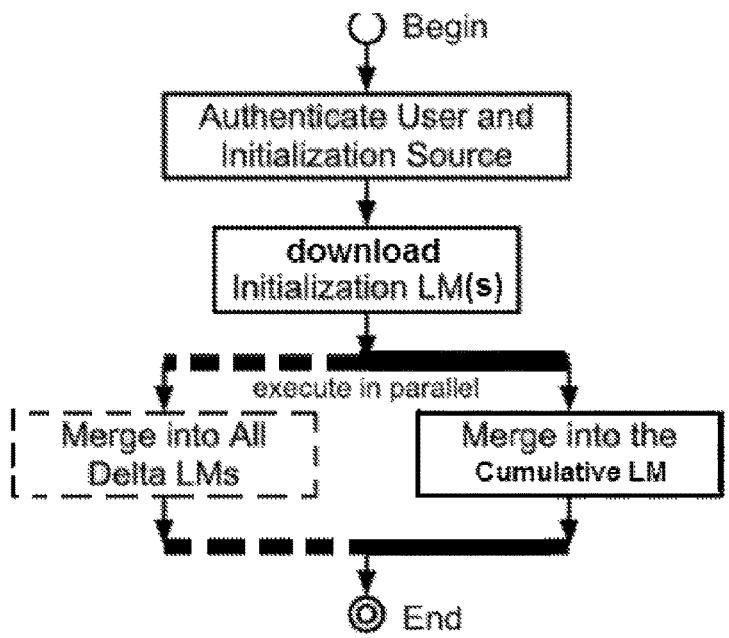
FIG. 10 illustrates the process of initialisation from the server's perspective.

The initialisation process is illustrated in FIG. 10. During initialisation, the mechanism for synchronising/server is configured to establish a secure connection with an initialisation source, i.e. the external mechanism that created the initialisation language model(s). The server authenticates the user and initialisation source and, once authenticated, the server downloads one or more initialisation language models from the initialisation source.

The server is then configured to merge the initialisation language model(s) into the cumulative language model. A direct consequence is that the devices synchronizing will not be required to perform an explicit initialization but will inherit that from the cumulative language model which is merged into the dynamic language models during initial synchronization.

If the initialisation process is to be performed, it is preferable for the server to perform the initialisation process when the first device of the system is synchronised, e.g. after initial synchronisation of device A in FIG. 3a or 4a. The preferred initialisation process is shown by the unbroken lines of FIG. 10.

However, the initialisation process could instead be performed at any point in the above described synchronisation process. If initialisation is performed after the first synchronization of the system (e.g. after initial synchronisation of device A), the initialization language model will be merged by the server into the cumulative language model and all of the delta language models. As a consequence, the devices of the system will receive the initialisation data during a subsequent synchronisation of the device, when the device downloads and merges the delta language model into its dynamic language model. Any device that synchronises with the mechanism/server at a later date (e.g. device D as described above) will receive the initialisation data as during initial synchronisation of the device, since the device will download the cumulative language model and merge it into its dynamic language model.

The Initialization process performed after first synchronisation is illustrated in FIG. 10, where the process now also includes the part of the process indicated by a dashed line (merging the initialisation language model into the delta language models). The merging of the initialisation model into the delta language models can be performed in parallel to the merging of the initialisation model into the cumulative language model.

In alternative embodiments, initialisation may occur on one of the devices, instead of at the mechanism or synchronisation server. In these embodiments, it is the device which connects with the initialisation source and downloads the initialisation language models as described above. Once the initialisation language model is downloaded, it is merged with the existing dynamic language model of the device, and the text data contained in the initialisation language model is incorporated into the text data of the device for synchronisation with the mechanism as described in detail above. Typically with device initialisation, the text data on the device will be in the form of a device delta language model, and incorporating the initialisation language model into the text data will comprise merging the initialisation language model into the device delta language model.

Device initialisation may be preferable in situations where the initialisation process requires interaction from the user (e.g. selecting initialisation sources, and authenticating 3rd party services). If the initialisation was performed by the mechanism, the mechanism would have to act as a proxy between the user and the external initialisation mechanism. Performing initialisation from the device instead therefore reduces implementation complexity by not having to implement a proxy mechanism on the synchronisation server. Also, with device initialisation, there is no dependency on the synchronisation service for the initialisation service, so initialisation is still possible in situations where synchronisation is unavailable or not used.

To ensure no bias is introduced due to repeated merging, the initialisation process is only performed once.

Two further aspects of the present invention are a mechanism and method for error mitigation. Error mitigation addresses the problems caused when a delta language model is transmitted from the mechanism to a device, but an error results in the device either not receiving or not being able to successfully use the delta language model. Examples of errors that could cause such a situation include network connectivity problems and data corruption; these are particularly common problems in mobile environments. In such an error scenario, the mechanism believes it has transmitted the delta language model to the device and clears it back to an empty delta language model. During a subsequent synchronisation, the device receives a delta language model that does not contain the content of the delta language model it previously failed to receive. Therefore, the predictions provided by this device will diverge from those provided by other devices used by the same user.

Without an error mitigation process such as those described in detail below, the only way to resolve this problem would be to transmit the cumulative dynamic language model from the mechanism to the device, and for the device to replace its dynamic language model with this cumulative model. However, there needs to be a means for detecting this error situation. Furthermore, transmission of the cumulative model would be inefficient as data which is already contained in the device's dynamic language model would be transmitted from the mechanism to the device as part of the cumulative language model.

Figure 11:
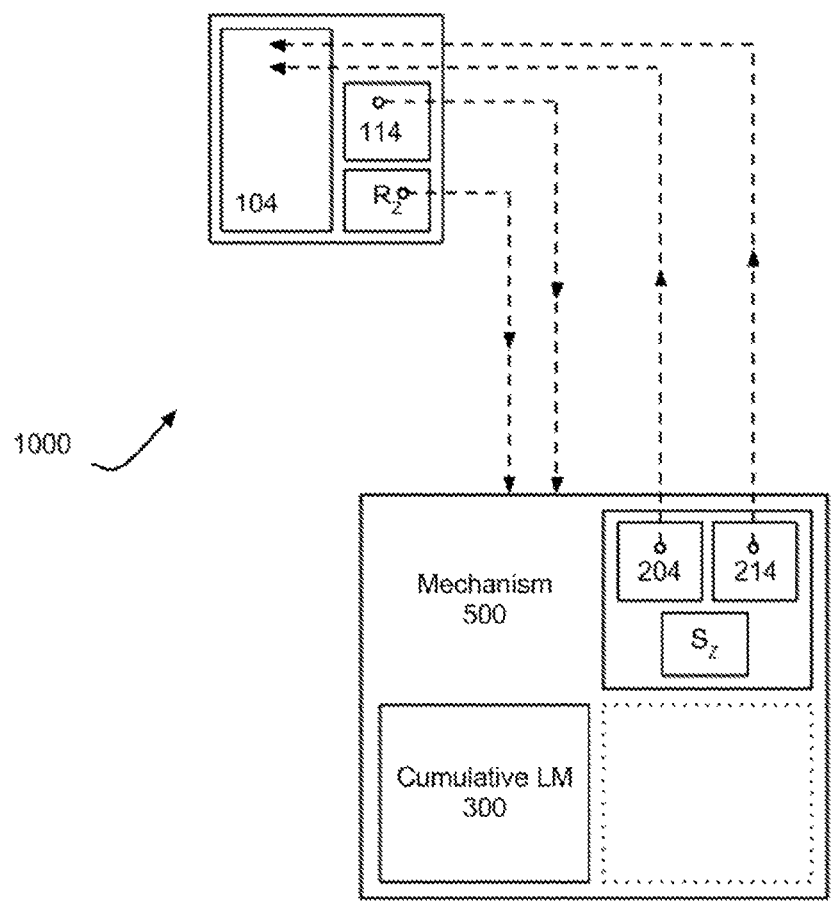
FIG. 11 illustrates data transfer during synchronisation in a system employing error mitigation in accordance with an aspect of the present invention.

An embodiment of a system 1000 employing error mitigation is shown in FIG. 11. For simplicity, only one device is shown in this figure, although it will be understood that a plurality of devices may be synchronised with the same mechanism 500. As before, the device Z comprises a dynamic language model 104 and text data 114 (which may, for instance, comprise actual text entered by the user or a language model trained on the text). The device Z also comprises a parameter R. For the system described above, the mechanism 500 preferably comprises a cumulative language model 300. The mechanism also comprises a primary delta language model 204, a back-up language model 214, and a parameter Sz specific to device Z. Data transfer of Rz and text data is shown with solid lines, since this data transfer occurs for all synchronisations. Either the primary delta language model or the back-up delta language model is transferred to the device during synchronisation (as described in detail below) so these possible data transfers are shown with broken lines.

Figure 12:
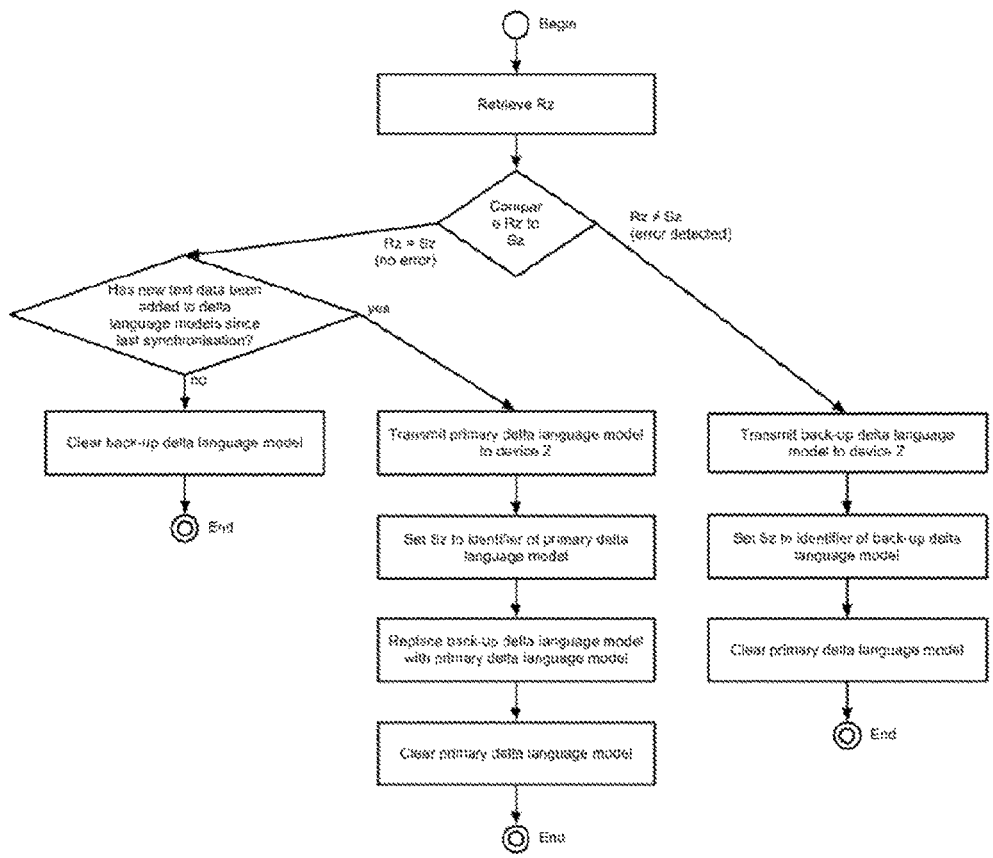
FIG. 12 illustrates the transfer of a delta language model to a device during synchronisation of a device with a server from the server's perspective in a system where error mitigation is employed.

A process performed by the mechanism during synchronisation of device Z when error mitigation is used is shown in FIG. 12. The steps shown in FIG. 12 correspond to and replace the steps "Provide the Delta LM" and "Clear the Delta LM" in FIG. 8. The error mitigation process illustrated by FIGS. 11 and 12 is described in more detail below.

In the embodiment of an error mitigation process illustrated in FIGS. 11 and 12, the mechanism further comprises a parameter S associated with each device representing data sent from the mechanism to the device. When a delta language model is transmitted to the device, the parameter S is set equal to an identifier I associated with the delta language model. The identifier I is also sent to the device with the delta language model. The identifier may, for example, be transmitted as HTTP parameters or custom headers, if HTTP is the communication protocol.

If the device receives the delta language model and identifier without error, the device sets a parameter R representing received data equal to the identifier I. If there is an error in the data transfer, then the parameter R is not updated, and remains equal to the identifier of the last successful synchronisation.

When the device is next synchronised, the device transmits parameter R to the mechanism. The mechanism compares the received parameter R to the stored parameter S. If the data transfer during the last synchronisation was successful, then the parameters R and S are identical. If they are not identical, then the data transfer of the last synchronisation was not successful and an error occurred.

To mitigate errors, the mechanism 500 comprises two delta language models associated with each device: one primary delta language model, and one back-up delta language model. The primary delta language model is equivalent to the delta language models described above in relation to, for example, FIGS. 3a, 3b, 4a and 4b. The primary delta language model comprises data representing the text input provided by synchronisations with all other devices since the last synchronisation of the associated device, as described in detail above.

The back-up delta language model is part of an error mitigation process. The back-up delta language model comprises data representing the text input provided by synchronisations with all other devices since the last synchronisation of the associated device for which it has been confirmed that the device received the delta language model without error. Therefore, as other devices are synchronised, the text data received from them is incorporated into both the primary delta language model and the back-up delta language model. The confirmation of receipt of the delta language model occurs through the transmission of the parameter R to the mechanism at the start of the next synchronisation. Therefore, if there have been no transmission errors, the back-up delta language model will contain text data from synchronisations with the other devices since the penultimate synchronisation of the associated device. If there have been previous errors in transmissions, the back-up delta language model may comprise text data collected since earlier synchronisations of the associated device.

Returning to FIG. 11, the mechanism receives the parameter R from the device. If the parameter R is identical to the parameter S at the start of the synchronisation, then the last synchronisation was successful and the primary delta language model is transferred to the device, along with an identifier for the primary delta language model. Parameter S is set to the identifier transmitted with the delta language model. In this case, the back-up delta language model is not required. The back-up delta language model may be cleared, and the primary delta language model is copied to the back-up delta language model. The primary delta language model is then cleared to make an empty delta language model ready to receive the text data from future synchronisations of the other devices.

If the parameter R is not identical to the parameter S at the start of synchronisation, then the last synchronisation was not successful. If this is the case, then the back-up delta language model is transmitted to the device. The back-up delta language model comprises the text data which was transmitted in the last unsuccessful transmission and the text data from subsequent synchronisations with other devices. Therefore, by transmitting the back-up delta language model to the device instead of the primary delta language model, the device receives the text data which would otherwise have been lost due to the error in the transmission. Parameter S is set to the identifier of the back-up delta language model. The primary delta language model is cleared to make an empty delta language model ready to receive the text data from future synchronisations of the other devices.

If no error is detected (that is, R is equal to S), and no new text data has been received from other devices since the last synchronisation of the device (and so the primary delta language model is empty), then no delta language model need be transmitted to the device. In this case, the back-up delta language model is cleared.

In some embodiments, the mechanism may comprise a further parameter C associated with each device representing the data confirmed to have reached the device. That is, after each synchronisation, C is set equal to the received text parameter R transmitted from the device. If an error occurs during transmission (and therefore R is not equal to parameter S) then the parameter R received by the mechanism during the next synchronisation should be equal to parameter C, since R will not have been updated because no successful transmissions have occurred in the interim. If R is not equal to either S or C then an unexpected serious fault has occurred, and the device should clear its dynamic language model, and replace it with the cumulative language model stored in the mechanism to ensure the device is synchronised correctly with the other devices. This could be enabled through the mechanism signalling an error to the device so that the device may request the cumulative model (e.g. by not specifying a parameter R), or alternatively by introducing a mechanism whereby the cumulative model is downloaded to the device instead of a delta model and the device is signalled to replace rather than merge with its dynamic language model.

Preferably, a unique identifier is associated with each set of text data transmitted from a device to the mechanism, and the identifier I associated with a delta language model is generated from the unique identifiers of the text data contained within that language model to provide a history of the text input (e.g. the unique identifier I is a string of the unique identifiers associated with the sets of text data). The identifier I may be equal to the unique identifier associated with the most recent text data to be incorporated into the delta language model. Preferably, the identifier of the text data is generated by the mechanism. Alternatively, the identifier of the text data may be generated by the device and transmitted to the mechanism. In a preferred embodiment, the identifier of the text data is generated from a timestamp. Alternatively, identifiers of text data could be generated from one or more of timestamps, sequential integers, random integers, or device identifiers. Standard identifiers may be used to indicate no language model (e.g. "-") or an empty language model (e.g. "0").

Associating a unique identifier with each set of text data transmitted from a device allows the merging of multiple delta language models (for example, if merging two different user accounts belonging to the same user). If the unique identifiers are sequential (for example, using timestamps) then they may be used to identify the order of user input history, and hence determine how the language models should be merged (for example giving priority to more recent data).

In some embodiments, the text data received by the mechanism from the other devices may be stored instead of the delta language models. The required delta language model may be generated from this data during synchronisation. For example, in the embodiments where the text data is in the form of a device delta language model, the mechanism may store the device delta language models. The mechanism may merge the relevant device delta language models to generate the delta language model specific to the device with which it is synchronising and/or may generate the cumulative language model by merging the device delta language models during synchronisation, In some embodiments, the back-up delta language model may not be updated with the subsequent synchronisations of other devices. In this case, the back-up delta language model only comprises text data transmitted to the mechanism from other devices prior to the last synchronisation of the associated device. The primary delta language model comprises text data transmitted to the mechanism from other devices since the last synchronisation of the associated device, as usual. Therefore, if there is a transmission error, and the back-up delta language model is required, then the data from both the primary and back-up delta language models must be transmitted to the device. This may be achieved by merging the two delta language models before transmission to the device, of the two delta language models may be transmitted separately.

In preferred embodiments, synchronisation of a device is initiated by the device and proceeds on a request-response basis. In this case, it may not be necessary to provide error mitigation in case of errors in the transmission of text data from the device to the mechanism, since errors in this transmission may be communicated to the device by the response (or lack thereof) from the mechanism during synchronisation. The device may initiate the synchronisation with a request (including the text data), and the delta language model is returned by the server to the device in the response. Therefore, if the request was successful (and the text data is transferred without error) then the mechanism will respond. The device may then clear the text data since it is known that the mechanism received it safely. If the mechanism does not respond as expected, then the device may transfer the text data again in a new synchronisation request.

In some embodiments, the device may transmit a confirmation of receipt of the delta language model immediately after receipt of the data. In this case, the mechanism will clear the delta language model specific to that device if receipt is confirmed. If receipt is not confirmed, then the delta language model will not be cleared. This receipt confirmation would negate the need for an error mitigation process involving primary and back-up delta language models as described above.

However, in some embodiments it may be advantageous to have an error mitigation process for the transfer of the text data from the device to the mechanism. This may be the case where the synchronisation is initiated by the server and proceeds on a request-response basis, or if there is asynchronous communication. In this case, an error mitigation process substantially similar to the one described above may be implemented. In this case, the device would store two sets of text data, one primary set of text data and one back-up set of text data. At each synchronisation, an identifier associated with the transmitted text data may be stored by the device, and sent with the text data to the mechanism. If the mechanism returns a matching identifier at the next synchronisation then the primary text data (which comprises text data collected since the last synchronisation) is transmitted to the mechanism. If the identifier received from the mechanism does not match the stored identifier, then the back-up text data (which comprises all text data collected since the last transmission confirmed as received by the mechanism) is transmitted to the mechanism. Such an error mitigation system may comprise any of the details of the error mitigation system described above for the delta language model mutatis mutandis.

As will be apparent from the above-description, the present invention also provides methods for synchronising a plurality of dynamic language models. A method comprises receiving, at a mechanism for synchronising, text data; incorporating, with the mechanism, the text data into at least one language model; and providing the at least one language model for synchronising the devices with the mechanism. One method comprises receiving, at the mechanism for synchronising, text that has been input by a user into a plurality of devices, each device comprising a dynamic language model. The method further comprises training, with the mechanism, at least one language model on the text, and providing the at least one language model for synchronising the devices with the mechanism. Another method comprises receiving, at a mechanism for synchronising, a device delta language model trained on text input by a user into a device. This method further comprises merging, with the mechanism, the device delta language model with at least one language model; and providing the at least one language model for synchronising the devices with the mechanism. Further aspects of the methods will be readily apparent from the above-description of FIGS. 3-9.

It will be appreciated that this description is by way of example only; alterations and modifications may be made to the described embodiment without departing from the scope of the invention as defined in the claims.

The invention claimed is:

1. A system comprising:
a processor;
memory storing instructions that, when executed by the processor, configure the processor to:
receive text data representing text that has been input by a user into one or more of a plurality of devices associated with the user;
incorporate the text data into one or more language models by accumulating frequencies of occurrence for sequences of the text data, wherein the frequencies are for occurrences in respective ones of the language models; and
provide the one or more language models to one or more of the plurality of devices, the one or more language models being combined to merge the frequencies for occurrences in respective ones of the language models at each of the devices;
wherein, in response to deployment of the one or more language models among the plurality of devices, the one or more language models enable synchronized text prediction for text inputs among the plurality of devices based on the merged frequencies for occurrences.

2. The system of claim 1 wherein the text data comprises text and incorporating the text data into one or more language models comprises training the at least one language model on the text.

3. The system of claim 1 wherein the text data comprises a device delta language model trained on the text input by the user and incorporating the text data into one or more language models comprises merging the device delta language model into the one or more language models.

4. The system of claim 1, wherein incorporating the text data into one or more language models comprises generating at least one language model from the text data or incorporating the text data into at least one existing language model.

5. The system of claim 1, wherein incorporating the text data into one or more language models comprises incorporating the text data into a single language model to generate a cumulative language model.

6. The system of claim 5, wherein the text data represents text entered into any of the plurality of devices since a previous synchronisation of the devices and incorporating the text data into one or more language models comprises incorporating the text data into the cumulative language model.

7. The system of claim 5 further comprising:
a plurality of devices, each device comprising a dynamic language model;
wherein each of the plurality of devices is configured to transmit to the processor text data representing text entered into that device, and wherein each device is configured to receive the cumulative language model and merge the cumulative language model into its dynamic language model before transmitting to the processor the text data entered into that device.

8. The system of claim 7, wherein the one or more language models comprises a data structure associating sequences of terms with a frequency of occurrence for each sequence and the device is configured to merge a first language model with a second language model by:
  adding the frequencies of occurrence for sequences in the data structure of he second language model to the frequencies of occurrence for corresponding sequences in the data structure of the first language model; and
  inserting a new sequence and its corresponding frequency of occurrence into the data structure of the first language model, if that sequence is in the data structure of the second language model but not in the data structure of the first language model.

9. The system of claim 1, wherein incorporating the text data into one or more language models comprises generating a delta language model for each of the plurality of devices using the text data received from the plurality of devices except the device associated with the delta language model.

10. The system of claim 9 further comprising:
  a plurality of devices, each device comprising a dynamic language model;
  wherein the system is configured to synchronise with a single device of the plurality of devices at a given time; and
  wherein each of the plurality of devices is configured to transmit to the processor text data representing text entered into that device, and wherein each device is configured to receive the delta language model associated with that device and merge the delta language model into its dynamic language model.

11. The system of claim 1, wherein the system is configured to synchronise with a single device of the plurality of devices at a given time.

12. The system of claim 1 further comprising:
  a plurality of devices, each device comprising a dynamic language model;
  wherein each of the plurality of devices is configured to transmit to the processor text data representing text that has been entered into that device.

13. The system of claim 12, wherein each dynamic language model of each device is configured to generate at least one text prediction based on text input into the device and wherein, once synchronised, the dynamic language models of the plurality of devices are capable of generating the same at least one text prediction when provided with the same text input.

14. The system of claim 12, wherein the system comprises a server and each of the plurality of devices is configured to download the one or more language models from the server and upload the text data onto the server.

15. The system of claim 1, wherein the one or more language models comprises a data structure associating sequences of terms with a frequency of occurrence for each sequence.

16. A method for synchronising a plurality of dynamic language models residing in a plurality of devices associated with a single user, each device comprising a dynamic language model, wherein the method comprises:
  receiving, at a mechanism for synchronising, text data representing text that has been input by a user into one or more of the plurality of devices;
  incorporating, with the mechanism, the text data into one or more language models by accumulating frequencies of occurrence for sequences of the text data, wherein the frequencies are for occurrences from each of the language models; and
  providing the one or more language models, the one or more language models being combined to merge the frequencies for occurrences in respective ones of the language models at each of the devices;
  wherein, in response to deployment of the one or more language models among the plurality of devices, the one or more language models enable synchronized text prediction for text inputs among the plurality of devices based on the merged frequencies for occurrences.

17. The method of claim 16, wherein the text data comprises text and incorporating the text data into one or more language models comprises training the at least one language model on the text.

18. The method of claim 16, wherein the text data comprises a device delta language model trained on the text input by the user and incorporating the text data into one or more language models comprises merging the device delta language model into the one or more language models.

19. The method of claim 18, wherein the one or more language models comprises a data structure associating sequences of terms with a frequency of occurrence for each sequence, and merging a first language model with a second language model comprises:
  adding the frequencies of occurrence for sequences in the data structure of the second language model to the frequencies of occurrence for corresponding sequences in the data structure of the first language model; and
  inserting a new sequence and its corresponding frequency of occurrence into the data structure of the first language model, if that sequence is in the data structure of the second language model but not in the data structure of the first language model.

20. The method of claim 16, wherein incorporating the text data into at least one language model comprises generating one or more language models from the text data or incorporating the text data into at least one existing language model.

21. The method of claim 16, wherein incorporating the text data into one or more language models comprises incorporating the text data into a single language model to generate a cumulative language model.

22. The method of claim 21, wherein the text data represents text entered into the plurality of devices since a previous synchronisation of the plurality of devices and incorporating the text data into one or more language models comprises incorporating the text data into the cumulative language model.

23. The method of claim 21, further comprising each device receiving the cumulative language model and merging the cumulative language model into the dynamic language model associated with that device prior to transmitting to the mechanism text data representing text entered into that device.

24. The method of claim 16, wherein each of the plurality of devices is synchronised individually with the mechanism.

25. The method of claim 16, wherein incorporating the text data into one or more language models comprises generating a delta language model for each of the plurality of devices using the text data received by the mechanism from the plurality of devices except the device associated with the delta language model.

26. The method of claim 25, wherein each of the plurality of devices is synchronised individually with the mechanism and wherein the text data incorporated into the delta language models comprises the text data received by the mechanism during a synchronisation and/or subsequent synchronisation of the plurality of devices except the device associated with the delta language model.

27. The method of claim 25, further comprising each device receiving the delta language model associated with that device and merging the delta language model into the dynamic language model of that device.

28. A non-transient computer readable medium containing program instructions which, when executed by a processor, configure the processor to carry out the method of claim 16.

* * * * *